US010484968B2

(12) United States Patent
Abedini et al.

(10) Patent No.: US 10,484,968 B2
(45) Date of Patent: Nov. 19, 2019

(54) BEAM DIRECTION ASSISTED PAGING

(71) Applicant: QUALCOMM Incorporated, San Diego, CA (US)

(72) Inventors: Navid Abedini, Somerset, NJ (US); Hong Cheng, Bridgewater, NJ (US); Junyi Li, Chester, NJ (US); Muhammad Nazmul Islam, Littleton, MA (US); Karl Georg Hampel, Hoboken, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/285,078

(22) Filed: Feb. 25, 2019

(65) Prior Publication Data
US 2019/0306829 A1    Oct. 3, 2019

Related U.S. Application Data

(60) Provisional application No. 62/649,503, filed on Mar. 28, 2018.

(51) Int. Cl.
*H04W 68/00*    (2009.01)
*H04W 68/02*    (2009.01)
(Continued)

(52) U.S. Cl.
CPC ............. *H04W 68/02* (2013.01); *H04W 8/08* (2013.01); *H04W 16/28* (2013.01)

(58) Field of Classification Search
CPC ........ H04W 68/02; H04W 8/08; H04W 16/28
(Continued)

(56) References Cited

U.S. PATENT DOCUMENTS

2014/0128109 A1    5/2014  Li et al.
2015/0263835 A1*   9/2015  Shattil .................... H04B 7/026
                                                      370/329
(Continued)

FOREIGN PATENT DOCUMENTS

WO    2018008925 A1    1/2018

OTHER PUBLICATIONS

Astri., et al., "Discussion on Downlink Overhead Reduction for NR Paging", 3GPP Draft; R2-1713746 Discussion on Downlink Overhead Reduction for NR Paging, 3rd Generation Partnership Project (3GPP), Mobile Competence centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, pp. 1-5, XP051372404, Retrieved from the Internet: URL: http://www.3gpp.org/ftp/tsg_ran/WG2_RL2/TSGR2_100/Docs/ [retrieved on Nov. 17, 2017], Section 2.
(Continued)

*Primary Examiner* — Nghi H Ly
(74) *Attorney, Agent, or Firm* — Arent Fox, LLP; Clint R. Morin

(57) ABSTRACT

A first RAN may determine beamforming information for a UE served by the first RAN. Then, the first RAN may transmit, to a second RAN or a core network, paging information for the UE served by the first RAN, wherein the paging information comprises the beamforming information for the UE. A core network component, e.g., an AMF, may receive the paging information comprising the beamforming information for the UE and may send a paging request to a second RAN for the transmission of a paging message to the UE, wherein the paging request is based on the received paging information. The second RAN may receive, from the first RAN or from the core network, paging information for the UE comprising beamforming assistance information for
(Continued)

the UE. The second RAN may then transmit a paging message to the UE based on the beamforming assistance information.

30 Claims, 15 Drawing Sheets

(51) Int. Cl.
*H04W 8/08* (2009.01)
*H04W 16/28* (2009.01)

(58) Field of Classification Search
USPC .................. 455/458, 466, 414.1, 422.1, 561
See application file for complete search history.

(56) References Cited

U.S. PATENT DOCUMENTS

| | | | |
|---|---|---|---|
| 2016/0198462 A1* | 7/2016 | Damnjanovic | H04W 72/04 370/336 |
| 2016/0337916 A1* | 11/2016 | Deenoo | H04W 8/22 |

OTHER PUBLICATIONS

Ericsson: "Corrections to Paging Related Text", 3GPP Draft; R2-1800364 - Draft CR TO TS 38.300 on Paging, 3rd Generation Partnership Project (3GPP), Mobile Competence Centre; 650, Route Des Lucioles; F-06921 Sophia-Cedex; France, vol. RAN WG2, No. Vancouver, Canada; Jan. 22, 2018-Jan. 26, 2018, Jan. 11, 2018 (Jan. 11, 2018), 8 Pages, XP051385690, Retrieved from the Internet: URL: http://www.3gpp.org/ftp/tsg_ran/WG2_RL2/TSGR2_AHs/ 2018_01_NR/Docs/ [retrieved on Jan. 11, 2018], Section 4.2, Section 9.2.2.4.2, Section 9.2.5.
International Search Report and Written Opinion—PCT/US2019/ 019607—ISA/EPO—dated Apr. 23, 2019.
Sequans Communications: "Reduced Overhead Paging Design", 3GPP Draft; R1-1800225 Reduced Overhead Paging Design, 3rd Generation Partnership Project (3GPP), Mobile Competence Centre, 650, Route Des Lucioles ; 7-06921 Sophia-Antipolis Cedex, France, vol. RAN WG1, No. Vancouver, Canada; Jan. 22, 2018-Jan. 26, 2018, Jan. 12, 2018 (Jan. 12, 2018), 6 Pages, XP051384292, Retrieved from the Internet: URL: https://www.3gpp.org/ftp/tsg_ ran/WG1_RL1/TSGR1_AH/NR_AH_1801/Docs/ [retrieved on Jan. 12, 2018], Section 2.

\* cited by examiner

US 10,484,968 B2

BEAM DIRECTION ASSISTED PAGING

CROSS REFERENCE TO RELATED APPLICATION

This application claims the benefit of U.S. Provisional Application Ser. No. 62/649,503, entitled "Beam Direction Assisted Paging" and filed on Mar. 28, 2018, which is expressly incorporated by reference herein in its entirety.

BACKGROUND

Technical Field

The present disclosure relates generally to communication systems, and more particularly, to paging a user equipment.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for a core network (CN) are provided. The apparatus receives, from a first Radio Access Network (RAN), paging information regarding a user equipment (UE) served by the first RAN, wherein the paging information comprises beamforming information for the UE. The apparatus sends a paging request to a second RAN for the transmission of a paging message to the UE, wherein the paging request is based on the received beamforming information.

In another aspect of the disclosure, a method, a computer-readable medium, and an apparatus for a first RAN are provided. The apparatus determines beamforming information for a UE served by the first RAN. The apparatus then transmits, to a second RAN or a core network, paging information for the UE served by the first RAN, wherein the paging information comprises the beamforming information for the UE.

In yet another aspect of the disclosure, a method, a computer-readable medium, and an apparatus for a first RAN are provided. The apparatus receiving a paging request for a UE. The first RAN also receives, from at least one of a second RAN, a third RAN and a core network, paging information regarding the UE served by the second RAN, wherein the paging information comprises beamforming information for the UE. The first RAN then transmits a paging message to the UE based on the beamforming information comprised in the paging information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
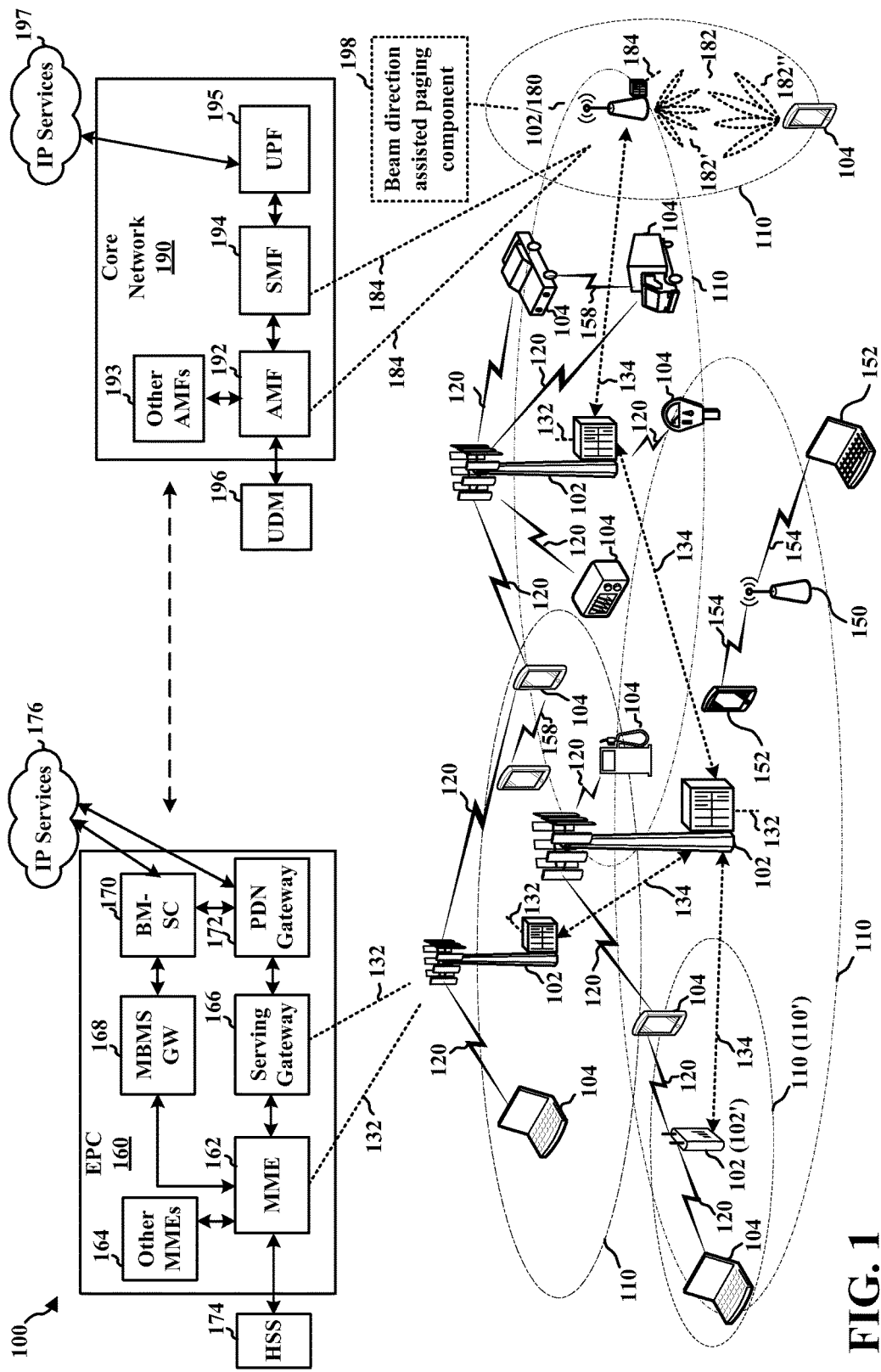
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) may include base stations 102, UEs 104, an Evolved Packet Core (EPC) 160, and other core networks 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a RAN (e.g., base station 102, 180) and other core network components may comprise a beam direction assisted paging component 198, e.g., as described in connection with the example aspects of FIGS. 5-14. For example, a RAN may be configured to provide paging assistance information to an AMF comprising beamforming information for a UE. The AMF may use the beamforming information to determine a paging strategy for the UE. The AMF may similarly be configured to provide beamforming assistance information to a second RAN in connection with a paging request for the UE. Alternately, or in addition, the first RAN may be configured to provide beamforming information to the second RAN, either directly or via a third RAN. The second RAN may use the beamforming assistance information/beamforming information to determine a beam direction to use to page the UE.

Figure 2:
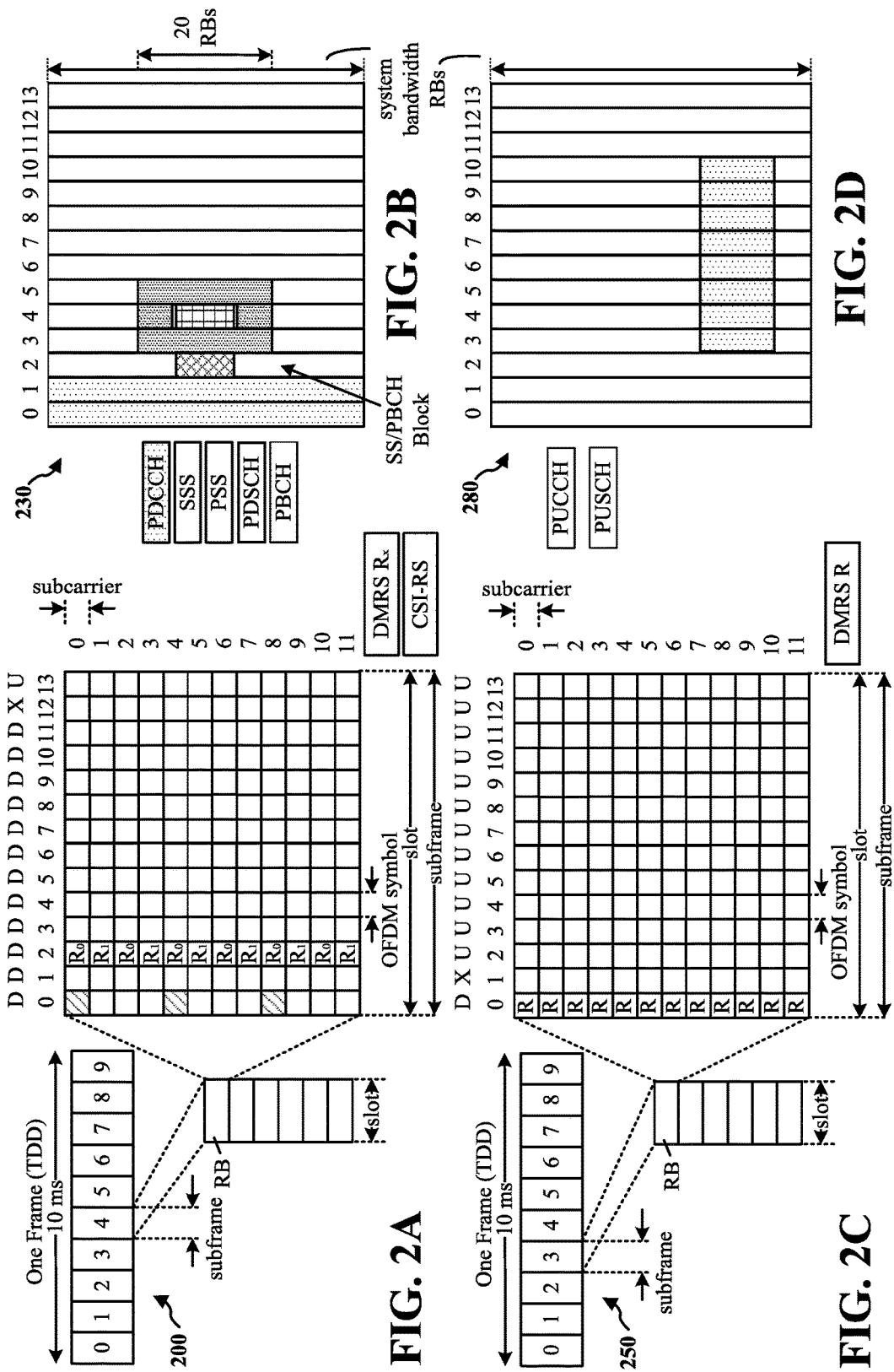
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^{\mu}*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
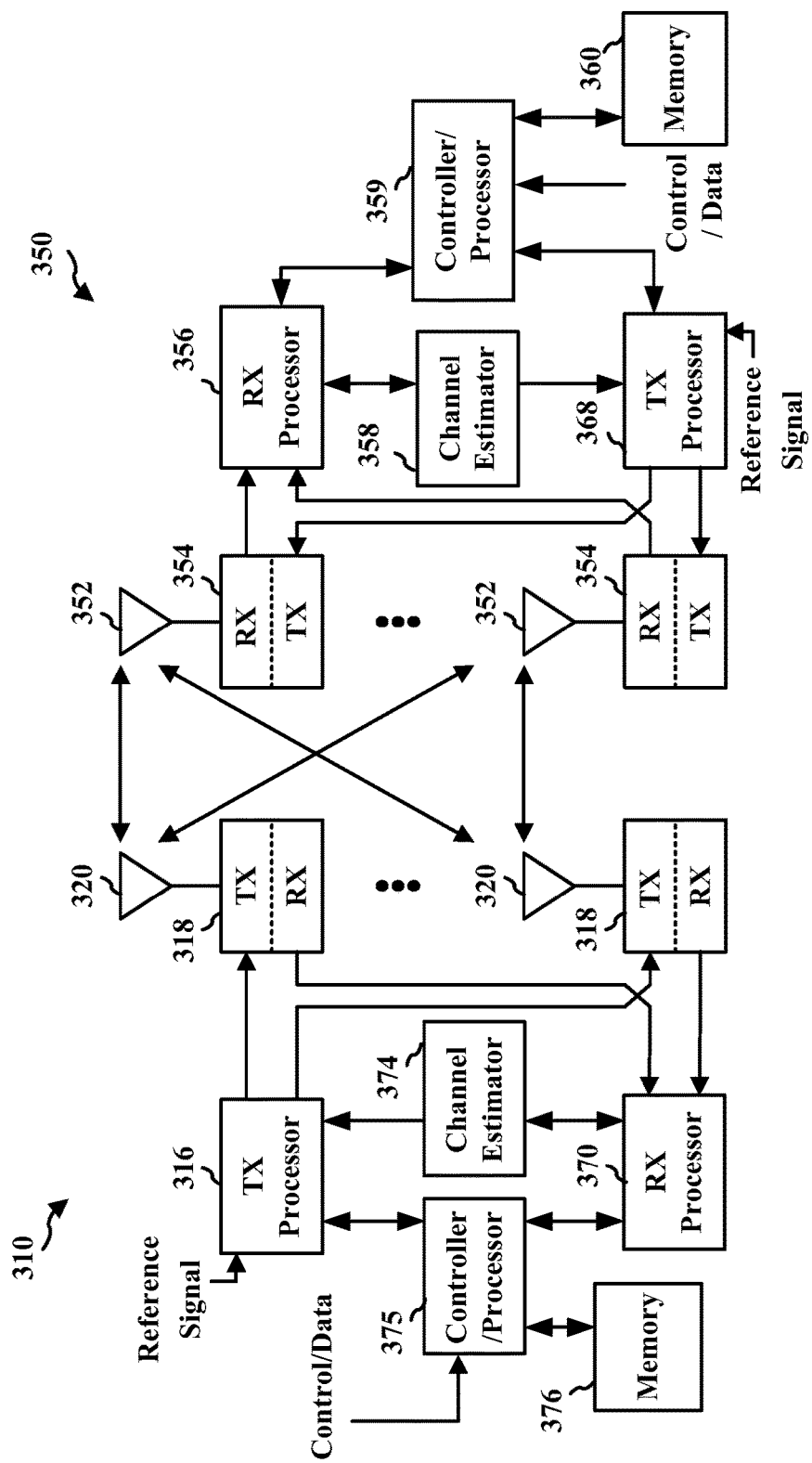
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
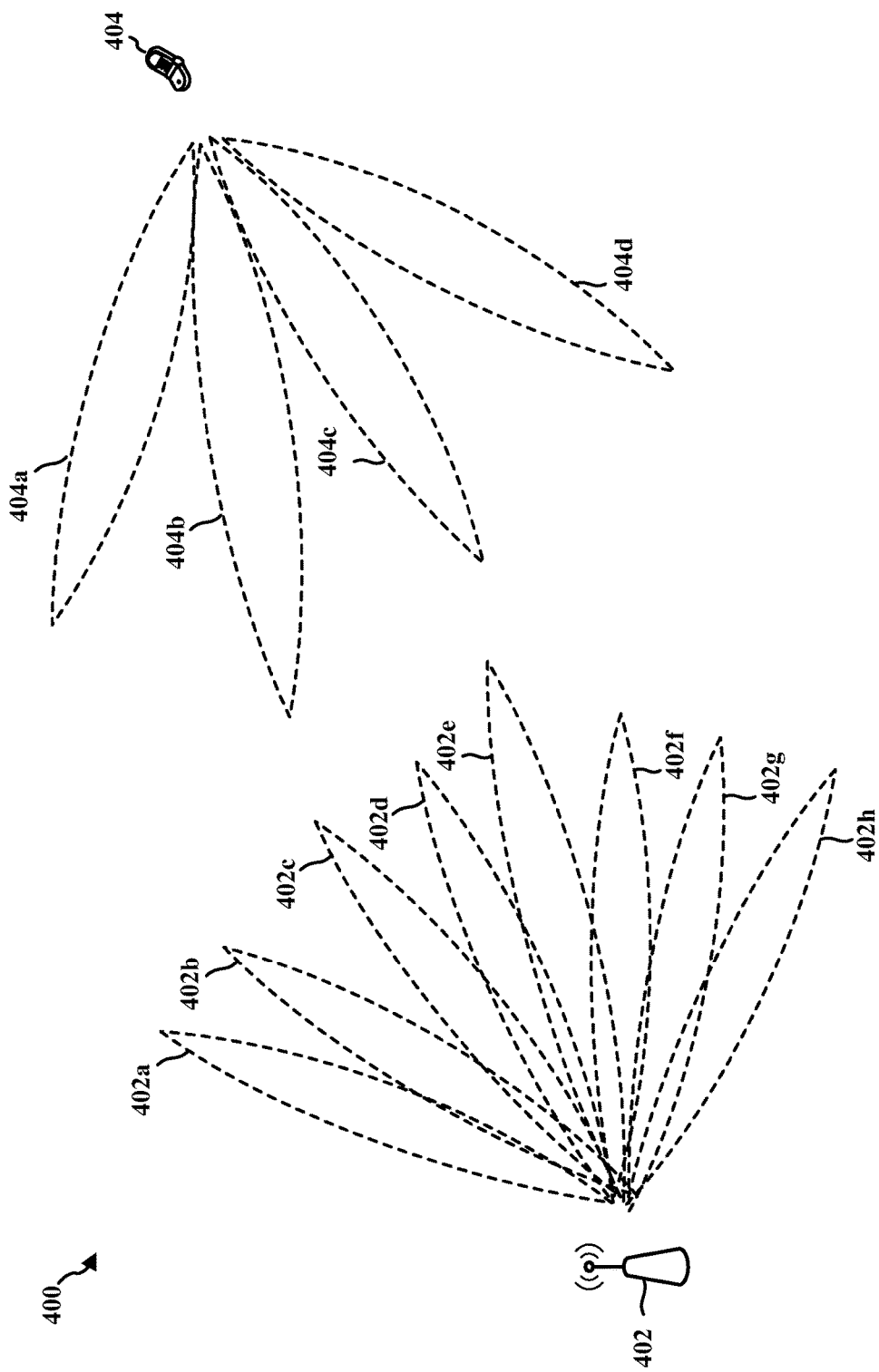
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

A UE may enter an idle mode or an inactive mode that may provide power savings to the UE. In an idle mode, the UE is not in a connected mode. While the UE is in an idle mode, a network may need to page the UE in order to establish a connection with the UE, e.g., when there is downlink traffic for the UE. In an inactive mode, the UE is in a connected mode, and an anchor base station maintains the context for the UE. However, while in the inactive mode, the UE is not actively communicating with the RAN. Thus, in an inactive mode, when there is downlink traffic for the UE, the UE may need to be paged, similar to the idle mode. The network may use one of two paging modes, a CN paging mode, and a RAN paging mode. CN paging mode and/or RAN paging mode may be employed, e.g., for NR based communication.

CN paging may be employed when a UE is in an idle mode and is not in communication with a cell. In CN paging, when the UE needs to be paged, the CN initiates the paging procedure. For example, the paging procedure may be initiated by the AMF (e.g., AMF 192). The AMF may send a paging request to at least one base station (e.g., base station 102/180) to send a paging message to the UE (e.g., UE 104). The paging request may be sent to a plurality of base stations covering a tracking area where the UE is expected to be located. The paging message prompts the UE to establish a connection with one of the base stations.

In RAN paging, a UE may be RRC-connected yet operating in an inactive mode. Thus, the anchor base station (e.g., base station 102/180) may be responsible to maintain information regarding the UE (e.g., UE 104). When the UE needs to be paged, the paging may be initiated by the anchor RAN. The anchor RAN may be the RAN that last served the UE. When downlink traffic becomes available for the UE in the inactive mode, the downlink traffic is sent to the anchor base station. The anchor base station then initiates paging for the UE. The anchor base station may send a paging request to at least one other base station to send a paging message to the UE. The paging request may be sent to a plurality of base stations covering a tracking area where the UE is expected to be located. The paging message prompts the UE to establish a connection with one of the base stations.

Figure 5:
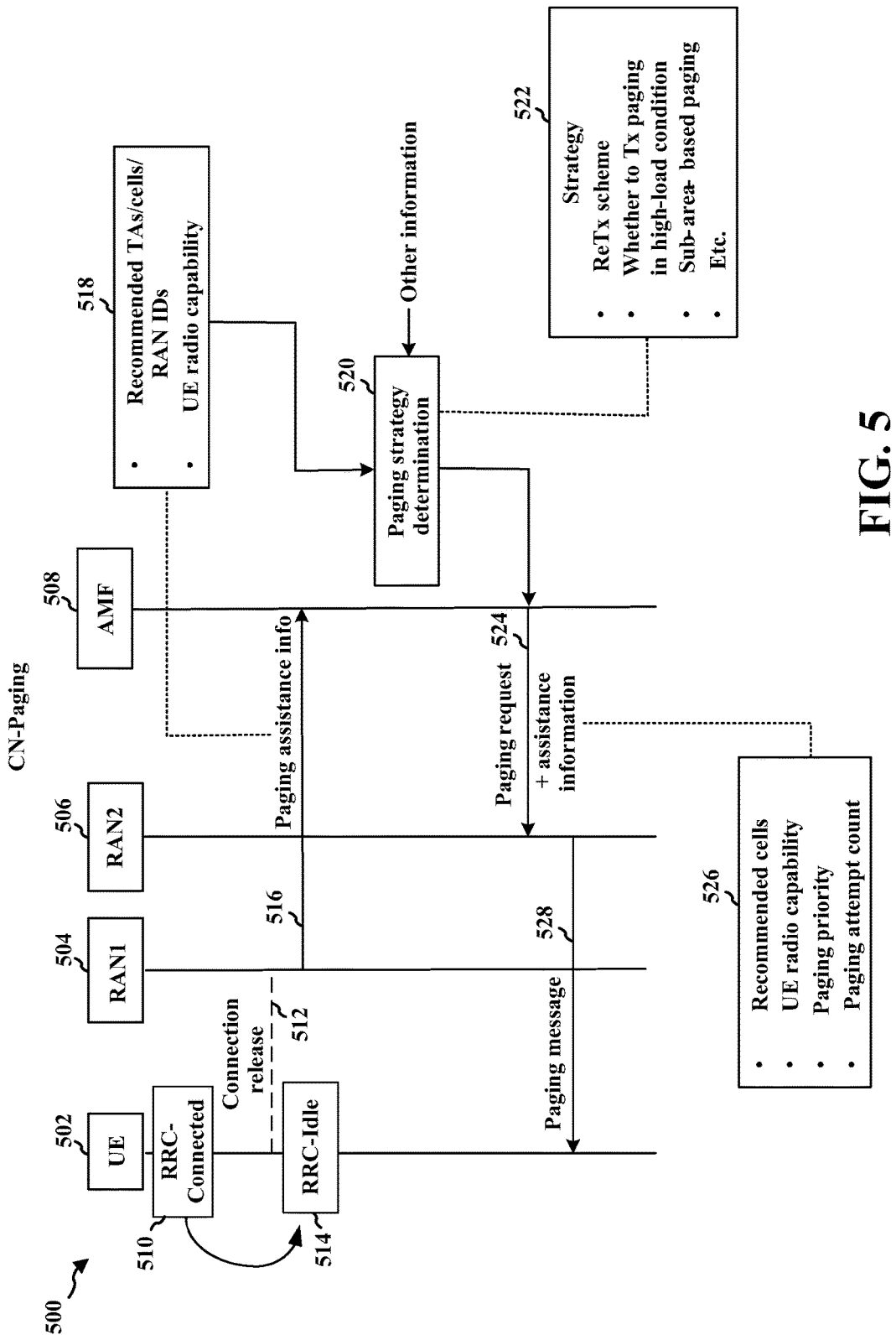
FIG. 5 illustrates an example of core network paging for a UE.

FIG. 5 illustrates an example of communication 500 involving CN paging. A UE 502 may establish an RRC connection with a first RAN (e.g., RAN1 504). The RAN may comprise a Next Generation RAN (NG-RAN). Thus, at 510, the UE may be in an RRC connected mode with RAN1 504. The UE may determine to enter an idle mode, e.g., when there is no ongoing communication with the network. At 512, the RRC connection between UE 502 and RAN1 504 may be released, and the UE may enter an idle mode at 514. In the idle mode, the UE may enter a sleep mode and may periodically wake up to determine whether the UE has been paged.

RAN1 504 may send paging assistance information 516 to the AMF 508 along with the release of the RRC connection with the UE 502. AMF 508 may correspond to AMF 192. Thus, the RAN1 may provide some information to the network that might be used to page the UE in the future. As illustrated at 518, the paging assistance information may include any combination of recommended tracking area(s) (TA), recommended cell(s), or recommended RAN IDs. The paging assistance information may also include UE radio capability information, such as a bandwidth supported by the UE.

The AMF 508 may use the paging assistance information 516, 518 to determine a paging strategy 520 for the UE. As in FIG. 5, the paging strategy may also be based on other information from other network entities, e.g., an indication of the importance of the paging, etc., in addition to the paging assistance information 516, 518. As illustrated at 522, aspects of the paging strategy may include any combination of a retransmission scheme, a determination of whether to transmit paging in high-load conditions, sub-area based paging information, etc.

When circumstances require the UE 502 to be paged, the AMF 508 may initiate a paging request 524 that is sent to a RAN, e.g., RAN2 506. RAN2 506 may comprise an NG-RAN. In addition to the paging request, or along with the paging request 524, the AMF may provide assistance information to RAN2 506 for paging the UE 502. The assistance information 526 may include any combination of recommended cells for paging the UE, UE radio capability (e.g., a supported bandwidth), a paging priority, a paging attempt count, etc. The assistance information may be based, at least in part, on the paging strategy 522 determined at 520. RAN2 506 then transmits a paging message 528 to the UE 502.

In both CN paging and RAN paging, the current location of the UE is not known because UE may have moved while in the idle mode or the inactive mode. Therefore, the UE may be paged in multiple locations in order to successfully deliver the paging message to the UE. In mmW communication, communication may be beamformed, as described in connection with FIG. 4. Thus, in addition to paging the UE in different locations, the UE may also need to be paged in multiple directions, e.g., beamswept paging. The paging message may need to be repeated multiple times in order to reach the UE. Each repetition may need to be beamswept to provide the repetitions of the paging message in the multiple directions. Thus, the need to beamsweep the paging message and to provide repetitions of the paging message can lead to multiple beamsweeping multiple times. Thus, the transmission of the paging message in multiple directions (e.g., on multiple beams) requires a large amount of overhead and places a substantial burden on base station. In addition to the problem of overhead, there may be an undesirable amount of latency in order to reestablish the connection with the UE.

The present application provides a solution to the problems of high overhead burden and undesirable latency in such paging of UEs by communicating beamforming assistance information between RANs and a CN. The beamforming assistance information may be communicated as additional information elements between the RAN and AMF. The RAN may provide a beam direction of UE or a location of UE. For example, the RAN may provide information regarding the beam direction last used to communicate with the UE, a series of beam directions used to communicate with the UE over time, and/or a location determined based on a satellite navigation system or local wireless nodes (e.g., Wi-Fi or cellular nodes) may be provided. The RAN may provide an analysis of the direction of the UE, e.g., by indicating a more likely direction in which the UE may move or a prediction regarding the UE's trajectory. This information may be provided to the AMF or to the other RANs to enable more efficient paging of the UE.

Figure 6:
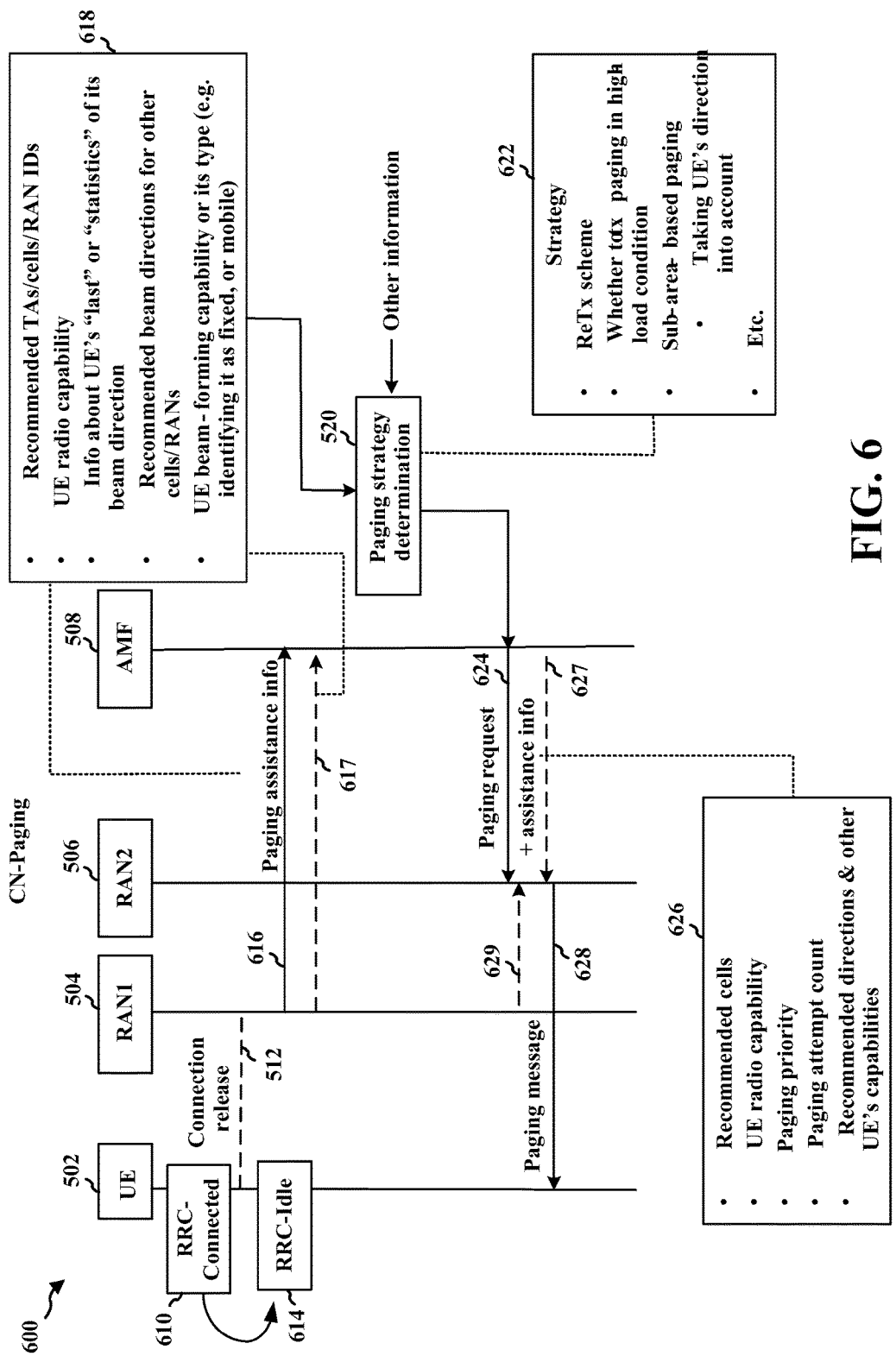
FIG. 6 illustrates another example of core network paging for a UE.

FIG. 6 illustrates an example of communication 600 for improved CN paging that reduces the overhead burden for paging and reduces latency to reestablish a connection with a UE. Aspects similar to FIG. 5 have been labeled with the same reference number. In FIG. 6, RAN1 504 may provide beam related information to the AMF 508 that may be used to page the UE. In one example, this beamforming information may be provided to the AMF along with the paging assistance information message 616 transmitted by the RAN1 504 after a connection release. In another example, the beamforming information may be provided in a separate message/indication 617 from the RAN1 504. The separate message 617 may be transmitted from the RAN1 504 to the AMF 508, e.g., while the UE is still in an RRC connected mode. The separate message 617 may be transmitted from the RAN1 504 to the AMF 508 upon a request from the AMF 508 to the RAN1 504.

As illustrated at 618, the beamforming information may include information regarding a last beamforming direction used in communication between the RAN 504 and the UE 502. The AMF/other RANs may use the last beam direction to select a beam to begin paging the UE based on the last beam direction used by the RAN 504. For example, initial paging may be transmitted in a beam direction based on the last beam direction or a subset of beam directions surrounding the last beam direction. If a response is not received from the UE, then the paging message may be sent to the UE in additional beam directions. If a base station that is transmitting the paging message is at a different location than the last base station used to communicate with the UE (e.g., before the UE entered RRC Idle state), the base station may use a beam that targets a similar location that would have been targeted by the last beam information for the last base station. For example, given a paging base station located directly eastward of the last base station along with beamforming information indicating that the last base station was transmitting eastward to communicate with the UE, the paging base station may page the UE using a beam facing westward. Similar determinations of beamforming information may be performed based on relative locations of the paging base station to the last base station, direction of travel of the UE, known traveling routes, or the like.

Figure 7:
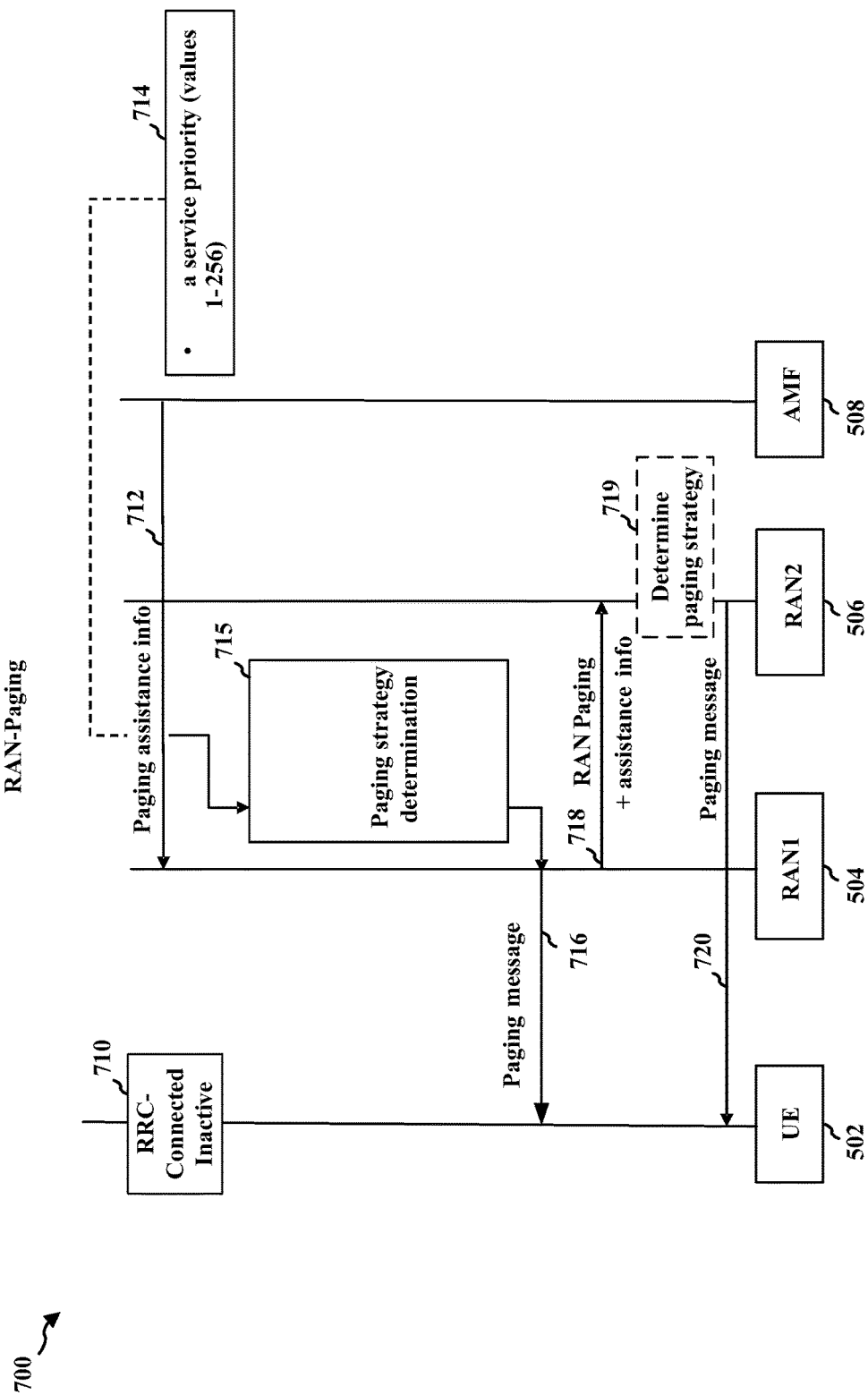
FIG. 7 illustrates an example of RAN paging for a UE.
Figure 8:
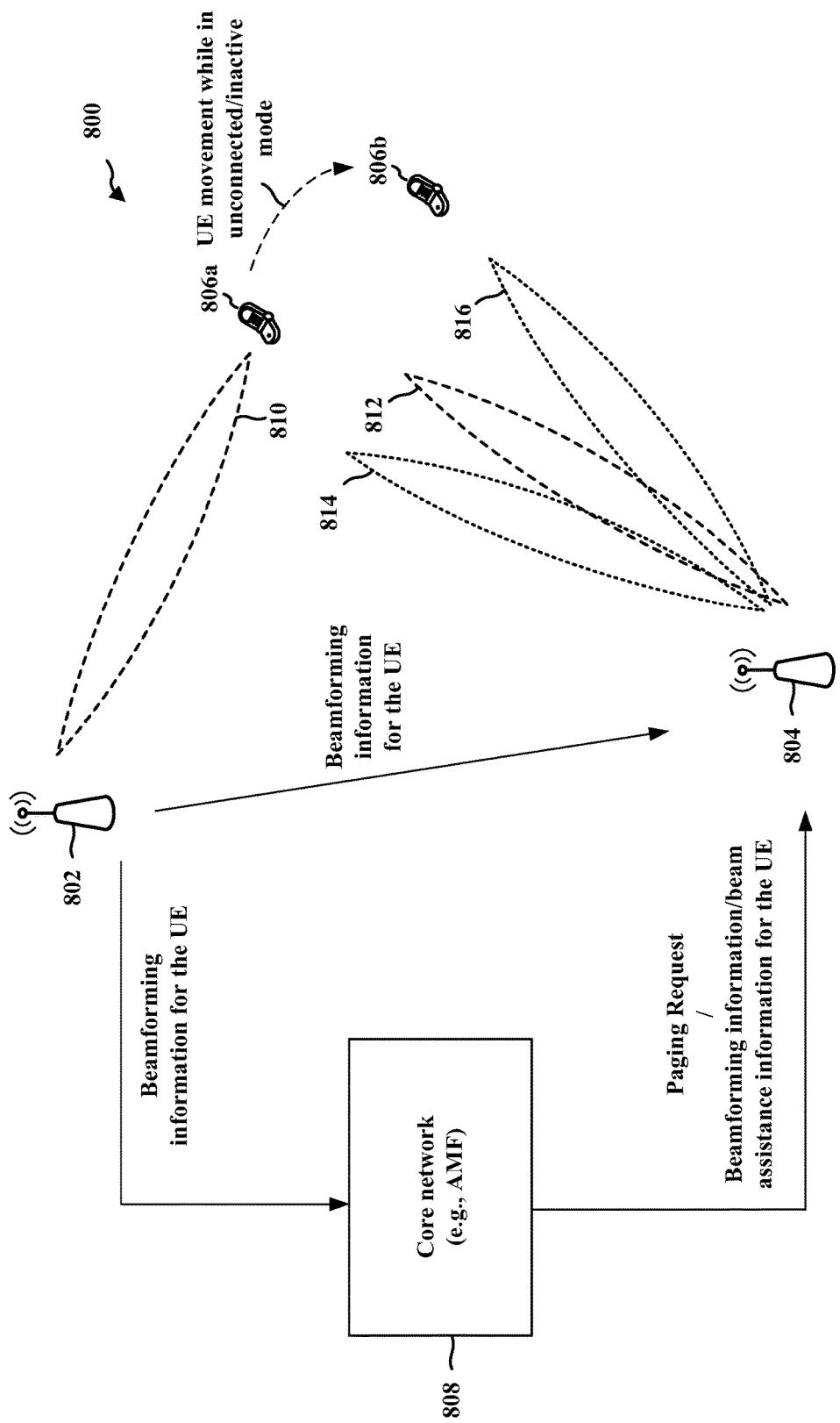
FIG. 8 is a diagram illustrating base stations and a core network in communication with a UE.

FIG. 8 illustrates an example 800 in which RAN 802 may provide beamforming information to either a CN 808 (e.g., AMF) or to another RAN 804. The beamforming information may indicate a last beam direction 810 used by RAN 802 to communicate with a UE while the UE was at a position 806a. The UE may be in an idle mode, as described in connection with FIG. 6 or may be in an RRC connected, inactive mode, as described in connection with FIG. 7. The beamforming information may be used to determine a beamforming direction(s) for RAN 804 to use to send a paging message for the UE. The initial paging message from RAN 804 may be sent in a beam direction based on the last beam direction. For example, beam direction 812 may be selected based on the last beam direction 810 used by RAN 802 to communicate with the UE. A subset of beam directions, e.g., 814, 816, surrounding the beam 812 may also be used to transmit the initial paging message. While in the idle/inactive mode, the UE may have moved to a different location, e.g., position 806b. Therefore, the use of beam directions surrounding beam 812 may assist the RAN in effectively sending the paging message to the UE. If the UE does not respond to the paging message, the paging message may be repeated and/or may be transmitted in additional/different beam directions. For example, the paging message may be beamswept if a response is not received to a certain number of repetitions of the paging message on the beam direction selected based on the beamforming information.

The beamforming information may include statistics regarding beam directions used in communication between the RAN1 504 and the UE 502. This may enable a determination of a change in direction/location of the UE over time. The beam direction statistics may be used to predict a location of the UE and to select a beam direction strategy for paging the UE similar to the example of the last beam direction.

The RAN1 504 may provide a report of DL and/or UL beam measurements corresponding to the UE 502 as a part of the beamforming information. The beam measurements may be measurements performed by the RAN1 and/or reports of measurements performed by the UE 502. Thus, this information collected by the RAN1 504 may be provided to the core network to assist with future paging of the UE.

The RAN1 may provide the beamforming information in terms of an absolute angular direction, e.g., a quantized angular direction. Thus, an angular value for the UE, e.g., relative to the RAN1 may be indicated to the core network. The RAN1 may provide the beam information in terms of an absolute direction. Thus, the RAN1 may share information regarding the location of the UE, while served by the RAN1, with the core network in connection with paging assistance information for an idle UE. This location information may include information that is more detailed than the mere presence of the UE within a cell, and may include angle or direction information relative to the RAN1.

In one example, the RAN1 may provide raw beamforming information to the core network. In another example, the RAN1 may perform an analysis or generate a summary based on the beamforming information measured by the RAN1 before sending processed or predicted beamforming information to the AMF 508. Thus, the beamforming information provided by the RAN1 to the AMF may include information regarding an expected trajectory for a mobile UE.

The beamforming information may include a recommended beam direction for other cells and/or other RANs. The recommended beam direction may be specific to a particular RAN, e.g., associated with a RAN ID. For example, RAN1 504 may use reported beam measurements that the RAN1 receives from the UE 502 regarding beam measurements of the neighboring cells to determine a more likely beam direction for paging the UE from the neighboring cells. After determining a likely beam direction, the RAN1 504 may provide the beam information to the AMF 508. In another example, the RAN1 504 may use inter-cell measurements, in place of or in addition to the UE beam measurements, to predict a more likely beam direction for paging the UE from the neighboring cells.

In another example, the beamforming information may include information regarding the UE beamforming capability. The RAN1 504 may provide beamforming capability information for the UE 502, e.g., such as a number and/or arrangement of the UE's antenna subarrays, a number and/or type of the transmission/reception beams of the UE, and/or whether the UE uses Omni beams or narrowbeams. The beamforming information may also include an indication of a type of UE, e.g., indicating whether the UE is a fixed UE or a mobile UE, a relay UE, an access UE, etc.

Thus, the information 617, 618 received by the AMF from the RAN may include the paging assistance information and the beamforming information.

The AMF 508 may use the beamforming information to determine to select a RAN to which the AMF will send a paging request, e.g., 624, for the UE. The beamforming information from RAN1 may also be used by the AMF to determine other aspects of a paging strategy. The AMF 508 may use the beam information to determine cells and/or directions within each RAN, the paging message 628 should be transmitted to the UE. The paging strategy may be determined by the AMF based on the beam information.

The AMF 508 may use the beamforming information to determine information to include in a paging request 624 and/or beamforming assistance information message 627 to be sent to RAN2 for paging the UE. Such information may be referred to herein as "beam assistance information," as the information may assist the RAN in determining a beam to use in paging the UE. The beamforming assistance information or beamforming assistance information may comprise the same information as the beamforming information sent by the RAN1 to the AMF. Thus, the information may be referred to as "beam information," "beamforming information," "beam assistance information," and "beamforming assistance information." In other examples, the beamforming assistance information may comprise a portion of the beamforming information sent by the RAN1, a compilation of beamforming information sent to the AMF by multiple RANs, or information generated by the AMF based on the beamforming information sent to the AMF by RAN1. For example, the AMF may determine a recommended direction for paging the UE for each of one or more base stations in a TA and may provide the recommended direction to the RAN2. As another example, each base station may determine its own recommended direction based on the beamforming information. The determination of a recommended direction, beam, or set of beams for initial paging by a base station may be performed at any level or within any entity within the RAN or core network without departing from the scope of the present disclosure.

The AMF 508 may explicitly provide beamforming assistance information, e.g. regarding the recommended direction for paging the UE 502 to the RAN2 506. For example, the AMF may define a priority per beam or for a group of beam directions for the UE. The AMF may define a priority per angular direction or per location for the UE. Information regarding the defined priority may be provided to the RAN2 as beamforming assistance information for paging the UE.

In another example, the AMF may provide the recommended beam direction to the RAN2 in an implicit manner. For example, the AMF may indicate a last serving RAN or cell to the RAN2. For example, the paging request 624 or a separate message 627 may include a last serving RAN ID or last serving cell ID. Such beamforming assistance information may also include an indication of time corresponding to the last serving RAN/cell. For example, time information or a time stamp may be included with the indication of the last serving RAN ID or the last serving cell ID. In another example, the core network may use timing information to determine what beamforming information to use in determining a paging strategy and/or to provide to RAN2 without explicitly indicating the time information to the RAN2.

The RAN2 may use this beamforming assistance information to infer a recommended beam direction for paging the UE. For example, rather than blindly sweeping all beam directions, the RAN2 may use the beamforming assistance information to determine a targeted beam sweep direction or beam sweep pattern. For example, a direction that is more likely to successfully deliver the paging message to the UE may be determined based on the beamforming assistance information. The beamforming assistance information may be used by the core network and/or the RAN2 to determine a paging strategy for paging the UE.

The beamforming assistance information sent to the RAN2 from the AMF may include beamforming capability information for the UE. Beamforming capability information for the UE may include, e.g., any of a number and/or arrangement of the UE's antenna subarrays, a number and/or type of the transmission/reception beams of the UE, and/or whether the UE uses Omni-beams or narrowbeams. The AMF may also indicate a type of UE, e.g., whether the UE is a fixed UE, a mobile UE, a relay UE, or an access UE.

In one example, the AMF may forward the beamforming information provided by the RAN 504 to the AMF at 616 or 617 as the beamforming assistance information in 624, 627. The AMF may forward all of the received beam information or may forward only a part of the beam information received from the RAN 504.

In another example, the AMF may process the beam information received from the RAN1 to determine the beamforming assistance information to send to RAN2 in connection with the paging request. For example, the AMF may receive reports and messages regarding beam information for the UE from multiple RANs. The AMF may determine assisting information, e.g., the beamforming assistance information, to be sent in connection with a paging request for the UE based on the reports and messages from the multiple RANs.

In one example, the beamforming assistance information may be signaled from the AMF 508 to the RAN2 506 along with or comprised in the paging request 624. In another example, the beamforming assistance information may be signaled separately by the AMF to the RAN2 506, as illustrated at 627. For example, the beamforming assistance information may be signaled to the RAN2 506 either before or after the paging request. In another example, the beamforming assistance information may be signaled to the RAN2 506 in response to a request from the RAN2. In yet another example, beamforming assistance information may be provided to the RAN2 506 directly from another RAN (e.g., RAN1 504) such as illustrated at 629. For example, the last serving RAN 504 for the UE may signal beamforming assistance information for the UE to the RAN2 506 to which the paging request is sent. In another example, the RAN2 506 may receive the beamforming assistance information from another RAN than the last serving RAN. The beamforming assistance information may be communicated from RAN1 504 to RAN2 506 through Xn signaling, for example.

The RAN2 506 receiving the paging request 624 may use the beamforming assistance information to select a beam direction to transmit the paging signal to the UE, e.g., a beam direction having a higher priority. For example, the RAN2 506 may transmit the paging signal in a first beam direction with a higher frequency. In another example, the RAN2 may determine to transmit the paging signal in a first beam direction initially and then in other beam directions after the transmission in the first beam direction. For example, the RAN2 may transmit the paging signal in the other directions, if the UE does not respond to the paging signal transmitted in the first beam direction.

FIG. 7 illustrates an example communication 700 for RAN paging including aspects presented herein. Aspects similar to FIGS. 5, 6 have been labeled with the same reference number. In FIG. 7, the UE 502 may be in an RRC connected state, and may also be in an inactive state 510. The RAN1 504 may be the anchor RAN for the UE, e.g., may be a last serving RAN for the UE. As the UE is RRC connected and the RAN1 maintains the context of the UE, the RAN1 504 may initiate paging of the UE 502, e.g., when downlink traffic becomes available for the UE. The RAN1 may transmit a paging message itself for the UE, e.g., 716.

The RAN1 504 may receive paging assistance information 712 from the core network, e.g., AMF 508. This may comprise additional information that the core network has acquired regarding the UE, e.g., from other RANs. Such information 712 may include a report of beam measurements corresponding to the UE, as reported by other RANs. The information 712 may include statistics determined by the AMF regarding the UE's direction or trajectory. The information 712 may include recommended cells and/or beam directions for the RAN1 504. The RAN1 504 may use the information provided by the AMF 508 and/or the beamforming information determined by NG-RAN1 for the UE to determine a paging strategy 718 for the UE. The paging strategy may also be based on other information received from the core network, such as a priority level regarding the DL traffic that triggered the paging of the UE. The RAN1 may send a paging message to the UE at 716 based on the determined paging strategy. The RAN1 may indicate 718 to other RANs to send a paging message to the UE when the UE does not respond to paging message 716.

The RAN1 may also indicate, e.g., at 718 to other RANs to send a paging request to the UE 502. For example, the RAN1 may instruction other RANs in the vicinity to page the UE, because the RAN1 is not sure of the UE's location. The RAN1 may provide beamforming information, which may also be referred to as beamforming assistance information, to the RAN2. The beamforming information/beamforming assistance information may comprise similar subject matter to the beamforming information that the RAN1 provides to the AMF and/or the beamforming assistance information that the AMF provides to the RAN, as described in connection with the CN paging of FIG. 6. In other examples, the beamforming assistance information provided by RAN1 to RAN2 may comprise different information that the RAN1 would send to the AMF.

The recommended direction may be indicated indirectly. For example, rather than explicitly providing a beam direction for RAN2, RAN2 may use a prior knowledge of the relative location of RAN1 along with an ID of RAN1 sending the paging request to select a more likely paging direction for the UE. As well, as described in connection with FIG. 8, the RAN2 may use the cell ID or a last beam direction used to communicate with the UE in order to infer a more likely direction for paging the UE. Thus, the RAN1 may provide RAN2 with a beam sweeping strategy, as determined at 715, or the RAN2 may determine a beam sweeping strategy at 719 based on the beamforming information/beamforming assistance information received from the RAN2.

In another example, the RAN2 may receive the information from a different RAN than RAN1. For example, the other RAN may be another RAN in the tracking area of the UE. The information may be provided by the RAN1 to the other RAN, which in turn provides the beamforming information/beamforming assistance information to the RAN2.

Figure 9:
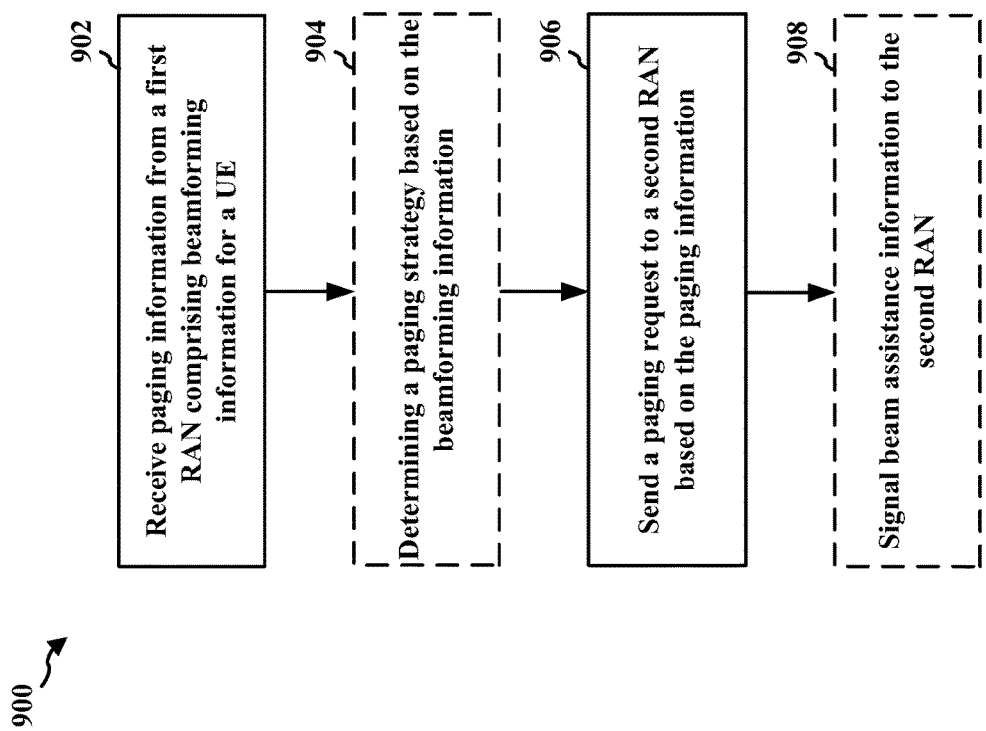
FIG. 9 is a flowchart of a method of wireless communication.

FIG. 9 is a flowchart 900 of a method of wireless communication. The method may be performed by a core network (e.g., AMF 508, 808, the apparatus 1002/1002'). Optional aspects may be illustrated with a dashed line. The method improves communication between a base station and a UE and the efficient use of wireless resources by using beamforming information about a UE, e.g., a UE in an idle mode/RRC inactive mode, to determine a paging strategy for the UE. The use of such beamforming information may reduce the overhead required to reach the UE and/or may reduce latency for connection reestablishment.

At 902, the core network receives, from a first RAN (e.g., RAN1 504, RAN 802), paging information regarding a UE (e.g., 502) served by the first RAN, wherein the paging information comprises beamforming information for the UE. FIG. 6 illustrates an example of RAN1 504 providing the beamforming information for UE 502 to an AMF 508. Similarly, FIG. 8 illustrates an example of a core network 808 receiving beamforming information for a UE from RAN 802.

At 906, the core network sends a paging request to a second RAN (e.g., RAN2 506, RAN 804) for the transmission of a paging message to the UE, wherein the paging request is based on the received beamforming information. FIG. 6 illustrates an example of AMF 508 sending a paging request 624 to RAN2 506 based on beamforming information received from RAN1 504. Similarly, FIG. 8 illustrates an example of a core network 808 sending a paging request to RAN 804 based on the beamforming information received from RAN 802. In an example, the communication may comprise beamformed communication, e.g., based on NR, and the first RAN and second RAN may each comprise an RAN.

The beamforming information received from the first RAN may comprise a last beam direction used by the first RAN to communicate with the UE. The beamforming information may comprise beam direction statistics for the UE. The beamforming information may comprise information regarding downlink beam measurements or uplink beam measurements for the UE. The beamforming information may comprise angular direction information or location information relative to the RAN. The beamforming information may comprise an expected trajectory for the UE. The beamforming information may comprise an indication of a recommended beam direction. The recommended beam direction may be based on UE beam measurements from neighboring cells. The recommended beam direction may be based on inter-cell measurements performed by the first RAN. The beamforming information may comprise a UE beam-forming capability. The beamforming information may comprise a UE type indicating whether the UE comprises one of a fixed UE, a mobile UE, a relay UE, or an access UE. Examples of such beamforming information are described in connection with FIGS. 6, 7, and 8.

The beamforming information may be received from the first RAN at 902 comprised in a paging assistance message, such as 616 described in connection with FIG. 6. The beamforming information may be received from the first RAN separately from a paging assistance message, such as 617 described in connection with FIG. 6.

As illustrated at 904, the core network may determine a paging strategy based on the received beamforming information at 904. Determining the paging strategy may include determining the second RAN to which to transmit the paging request. Determining the paging strategy may include determining at least one cell within the second RAN for transmission of the paging message to the UE. Determining the paging strategy may include determining at least one direction for transmission of the paging message to the UE. Determining the paging strategy may include determining beam assistance information for transmission to the second RAN. The paging strategy may be based on additional beamforming information for the UE received from at least one additional RAN, e.g., 1054.

As illustrated at 908, the core network may signal beamforming assistance information to the second RAN based on the received beamforming information for the UE. The term beamforming assistance information is used merely to help distinguish the information received at 902 and the information transmitted at 908. The information may even be the same, and both may be considered beamforming information or beamforming assistance information. In other examples, the beamforming assistance information sent to the second RAN may be different than the beamforming information received from the first RAN. The beamforming assistance information signaled to the second RAN may comprise at least a part of the beamforming information received from the first RAN at 902. The beamforming assistance information signaled to the second RAN may comprise at least one of recommended beam direction information, UE beamforming capability information, a UE type indicating whether the UE comprises one of a fixed UE, a mobile UE, a relay UE, or an access UE, an identity of the first RAN, and an identity of a cell of the first RAN that was associated with the UE. The beamforming assistance information may be signaled to the second RAN in the paging request, e.g., in paging request 624. The beamforming assistance information may be signaled to the second RAN separately from the paging request, e.g., at 627.

In another example, beamforming assistance information may be signaled to the second RAN through one or more other RANs, e.g., as described in connection with FIGS. 7 and 8.

Figure 10:
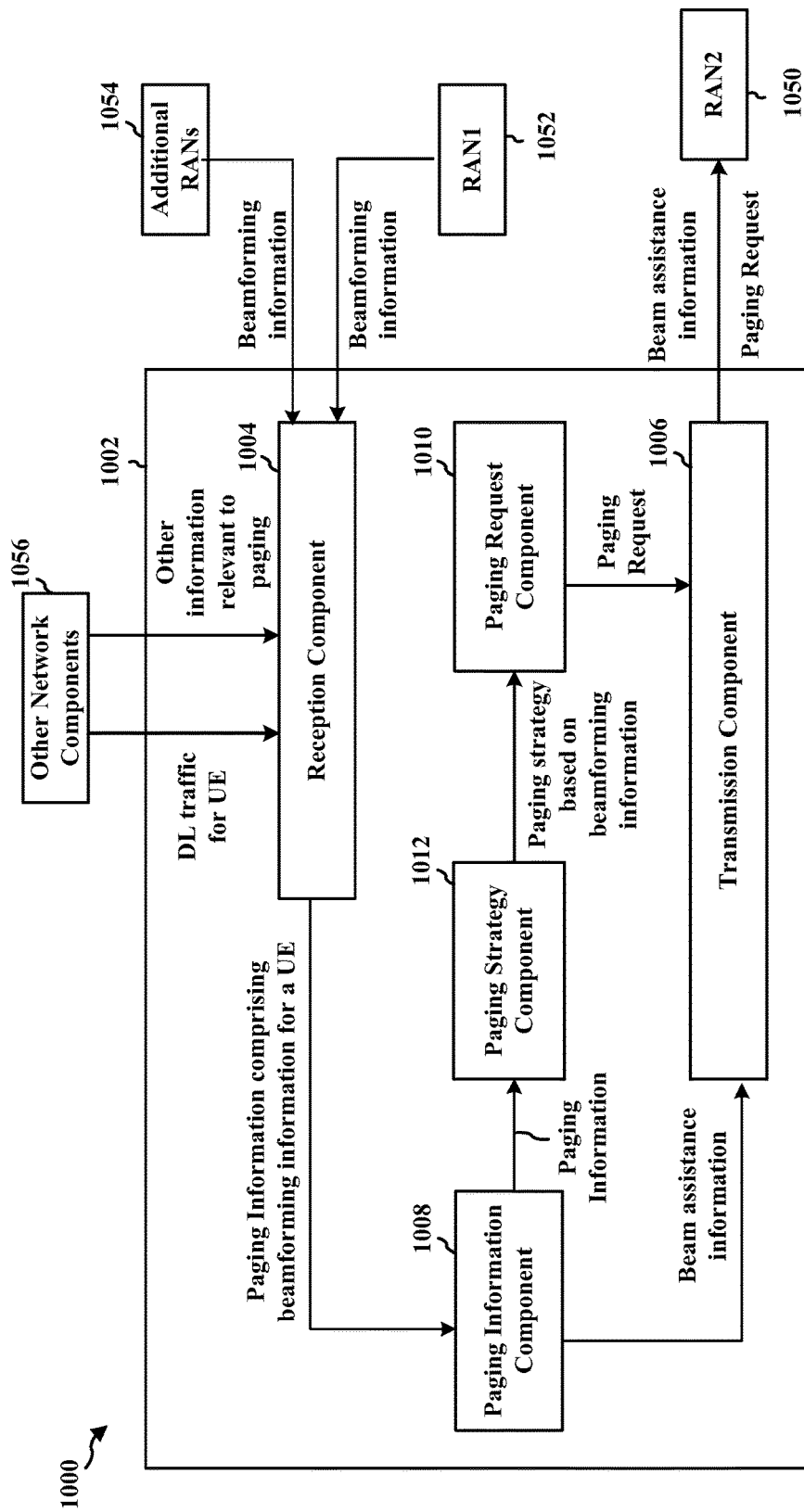
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be an core network apparatus (e.g., AMF 508, 808). The apparatus includes a reception component 1004 that receives communication, e.g., from RAN(s) 1050, 1052, 1054 (e.g., base station 102, 180, 310, 402, RAN 504, 506, RAN 802, 804) and other network components 1056. The apparatus includes a transmission component 1006 that sends information to the RAN(s) and/or other network components. The apparatus includes a paging information component 1008 that receives, from a first RAN 1052, paging information regarding a UE served by the RAN, wherein the paging information comprises beamforming information for the UE. The apparatus includes a paging request component 1010 that sends a paging request to a second RAN for the transmission of a paging message to the UE, wherein the paging request is based on the received paging information. The paging request may be triggered by the presence of DL traffic for the UE, e.g., which may be received via other network components 1056. The apparatus may further include a paging strategy component 1012 that determines a paging strategy based on the received beamforming information. The paging strategy may also be based on other information received from other network components 1056 and/or additional beamforming information for the UE received from additional RAN(s) 1054. The transmission component 1006 may be configured to signal beamforming assistance information to the second RAN 1050 based on the received beamforming information for the UE, in connection with the paging information component 1008.

The apparatus may include additional components that perform each of the blocks of the algorithm in the aforementioned flowcharts of FIGS. 6, 7, and 9. As such, each block in the aforementioned flowcharts of FIGS. 6, 7, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
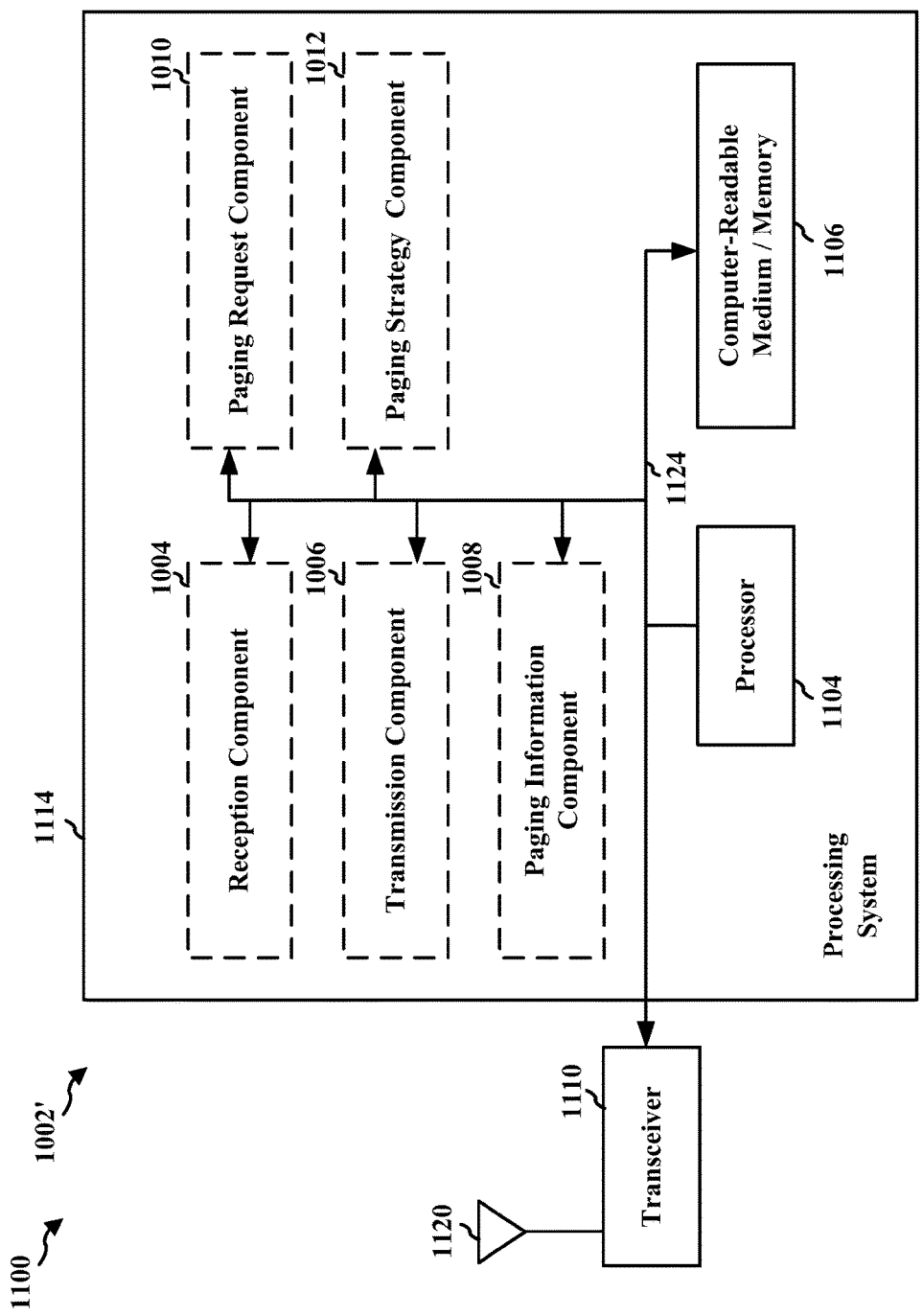
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof.

In one configuration, the apparatus 1002/1002' for wireless communication includes means for receiving, from a first RAN, paging information regarding a UE served by the RAN (e.g., at least 1008), wherein the paging information comprises beamforming information for the UE; means for sending a paging request to a second RAN for the transmission of a paging message to the UE (e.g., at least 1010), wherein the paging request is based on the received paging information, and means for determining a paging strategy based on the received beamforming information (e.g., at least 1012). The aforementioned means may be one or more of the aforementioned components of the apparatus 1002 and/or the processing system 1114 of the apparatus 1002' configured to perform the functions recited by the aforementioned means.

Figure 12:
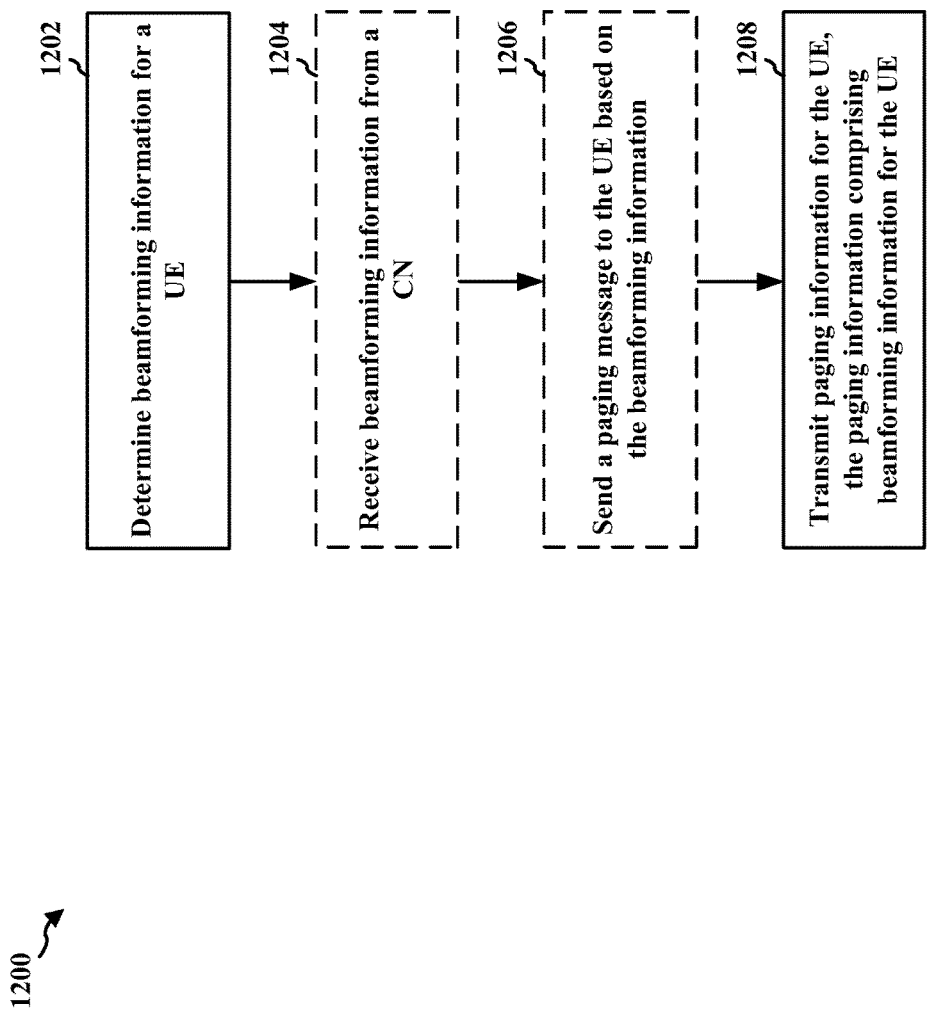
FIG. 12 is a flowchart of a method of wireless communication.

FIG. 12 is a flowchart 1200 of a method of wireless communication. The method may be performed by a RAN (e.g., base station 102, 180, 310, 402, RAN1 504, RAN 802, 1052, the apparatus 1402, 1402'). The RAN may be referred to as a first RAN. Optional aspects are illustrated with a dashed line. The method improves communication between a base station and a UE and the efficient use of wireless resources by using beamforming information about a UE, e.g., a UE in an idle mode/RRC inactive mode, to page the UE. The use of such beamforming information may reduce the overhead required to reach the UE and/or may reduce latency for connection reestablishment.

At 1202, the RAN determines beamforming information for a UE served by the first RAN. The beamforming information may comprise a last beam direction used by the first RAN to communicate with the UE. The beamforming information may comprise beam direction statistics for the UE. The beamforming information may comprise information regarding downlink beam measurements or uplink beam measurements for the UE. The beamforming information may comprise angular direction information or location information relative to the RAN. The beamforming information may comprise an expected trajectory for the UE. The beamforming information may comprise an indication of a recommended beam direction. The recommended beam direction may be based on UE beam measurements from neighboring cells. The recommended beam direction may be based on inter-cell measurements performed by the first RAN. The beamforming information may comprise a UE beam-forming capability. The beamforming information may comprise a UE type indicating whether the UE comprises one of a fixed UE, a mobile UE, a relay UE, or an access UE.

At 1202, the RAN may transmit, to at least one second RAN or a core network, paging information for the UE served by the first RAN, wherein the paging information comprises the beamforming information for the UE.

The UE may be in an idle mode, and the first RAN may transmit the paging information to the core network for use in paging the UE, as described in connection with FIG. 6. The UE may be in an RRC connected inactive mode, and the first RAN may transmit the paging information to the second RAN, as described in connection with FIG. 7. In a CN paging mode, the first RAN may transmit beamforming information to the second RAN.

The beamforming information may be transmitted by the first RAN at 1208 comprised in a paging assistance message, such as 616 described in connection with FIG. 6. The beamforming information may be transmitted by the first RAN to the CN separately from a paging assistance message, as described in connection with 617 in FIG. 6. The beamforming information may be transmitted from the first RAN to the second RAN, e.g., in Xn signaling. FIG. 7 illustrates an example of a first RAN sending beamforming assistance information to a second RAN. The beamforming assistance information may be sent directly from the first RAN to the second RAN or via a third RAN.

As illustrated at 1204, the RAN may receive additional beamforming information regarding the UE from the core network. The additional beamforming information may comprise information derived from at least one additional RAN. FIG. 7 illustrates an example in which the RAN may receive paging assistance information, which may include beamforming information, from a core network. As illustrated at 1206, the RAN may send a paging message to the UE based on the additional beamforming information. For example, as illustrated in FIG. 7, the RAN may send a paging message to the UE. The paging information for the UE may be transmitted to the second RAN, e.g., when the first RAN does not receive a response from the UE to the paging message.

The additional beamforming information may comprise beam measurements corresponding to the UE for the at least one additional RAN. The additional beamforming information may comprise statistics of a trajectory for the UE based on information from the at least one additional RAN. The additional beamforming information may comprise a recommended cell and/or a recommended direction.

Figure 13:
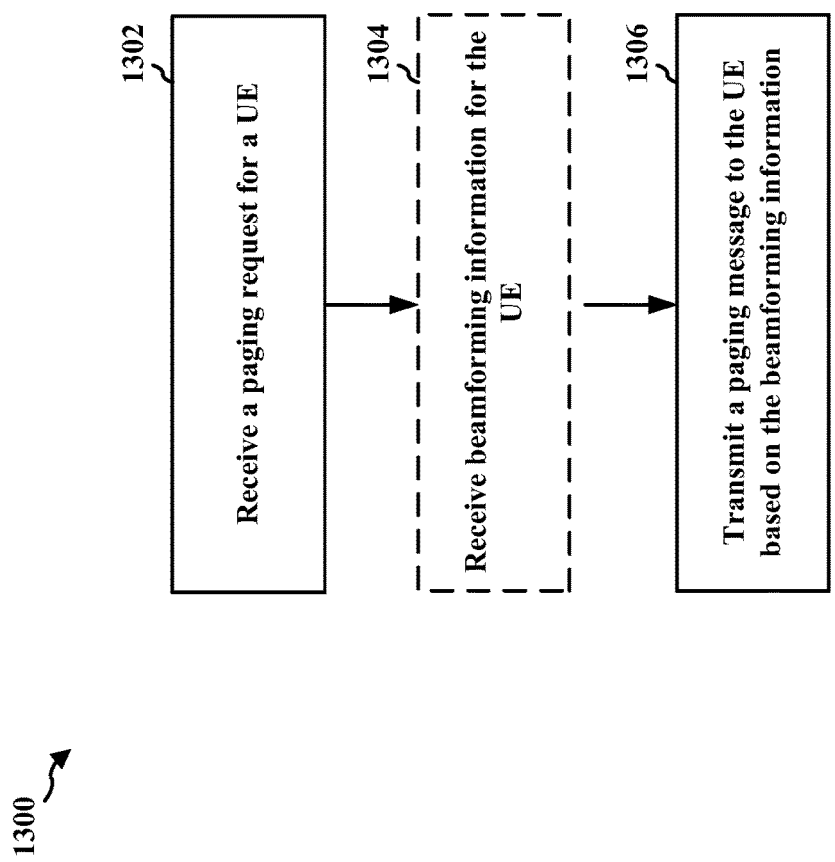
FIG. 13 is a flowchart of a method of wireless communication.

FIG. 13 is a flowchart 1300 of a method of wireless communication. The method may be performed by a RAN (e.g., base station 180, 310, 402, RAN2 506, RAN 804, 1050, the apparatus 1402, 1402'). Optional aspects are illustrated with a dashed line. The method improves communication between a base station and a UE and the efficient use of wireless resources by using beamforming information about a UE, e.g., a UE in an idle mode/RRC inactive mode, to page the UE. The use of such beamforming information may reduce the overhead required to reach the UE and/or may reduce latency for connection reestablishment.

At 1302, the RAN receives a paging request for a UE. FIG. 6 illustrates an example of a paging request 624 being received by RAN2 506 from AMF 508. FIG. 7 illustrates an example in which paging is initiated by NG-RAN1.

At 1304, the RAN receives, from at least one of a second RAN, a third RAN and a core network, paging information regarding the UE served by the second RAN, wherein the paging information comprises beamforming information for the UE. The beamforming information may be referred to as beamforming assistance information. FIG. 6 illustrates an example of beamforming assistance information being received by RAN2 506 from AMF 508. FIG. 7 illustrates an example in which the beamforming assistance information 718 is received from RAN1 504.

At 1306, the RAN transmits a paging message (e.g., 628, 720) to the UE based on the beamforming information comprised in the paging information. Transmitting the paging message to the UE may comprise selecting a beam direction for transmission of the paging message based on the beamforming information for the UE.

The RAN may further determine a paging strategy based on the beamforming information for the UE. For example, the paging strategy may comprise at least one of a priority level associated with at least one beam direction and a frequency associated with the at least one beam direction.

The UE may be in an idle mode, and the paging information may be received from the core network, such as described in the example in FIG. 6.

The UE may be in an RRC connected inactive mode, and the paging information may be received from the second RAN, such as described in the example in FIG. 7.

The beamforming information may comprise a last beam direction used by the second RAN to communicate with the UE. The beamforming information may comprise beam direction statistics for the UE. The beamforming information may comprise information regarding downlink beam measurements or uplink beam measurements for the UE. The beamforming information may comprise angular direction information or location information relative to the RAN. The beamforming information may comprise an expected trajectory for the UE. The beamforming information may comprise an indication of a recommended beam direction. The recommended beam direction may be based on UE beam measurements from neighboring cells. The recommended beam direction may be based on inter-cell measurements performed by the second RAN. The beamforming information may comprise a UE beam-forming capability. The beamforming information may comprise a UE type indicating whether the UE comprises one of a fixed UE, a mobile UE, a relay UE, or an access UE.

The beamforming information may be received from the core network in the paging request, e.g., 624. The beamforming information may be received from the core network separately, e.g., at 627, from the paging request, e.g., 624. The beamforming information may be received from the second RAN in Xn signaling. For example, FIG. 7 illustrates an example in which the beamforming information is received from another RAN.

Figure 14:
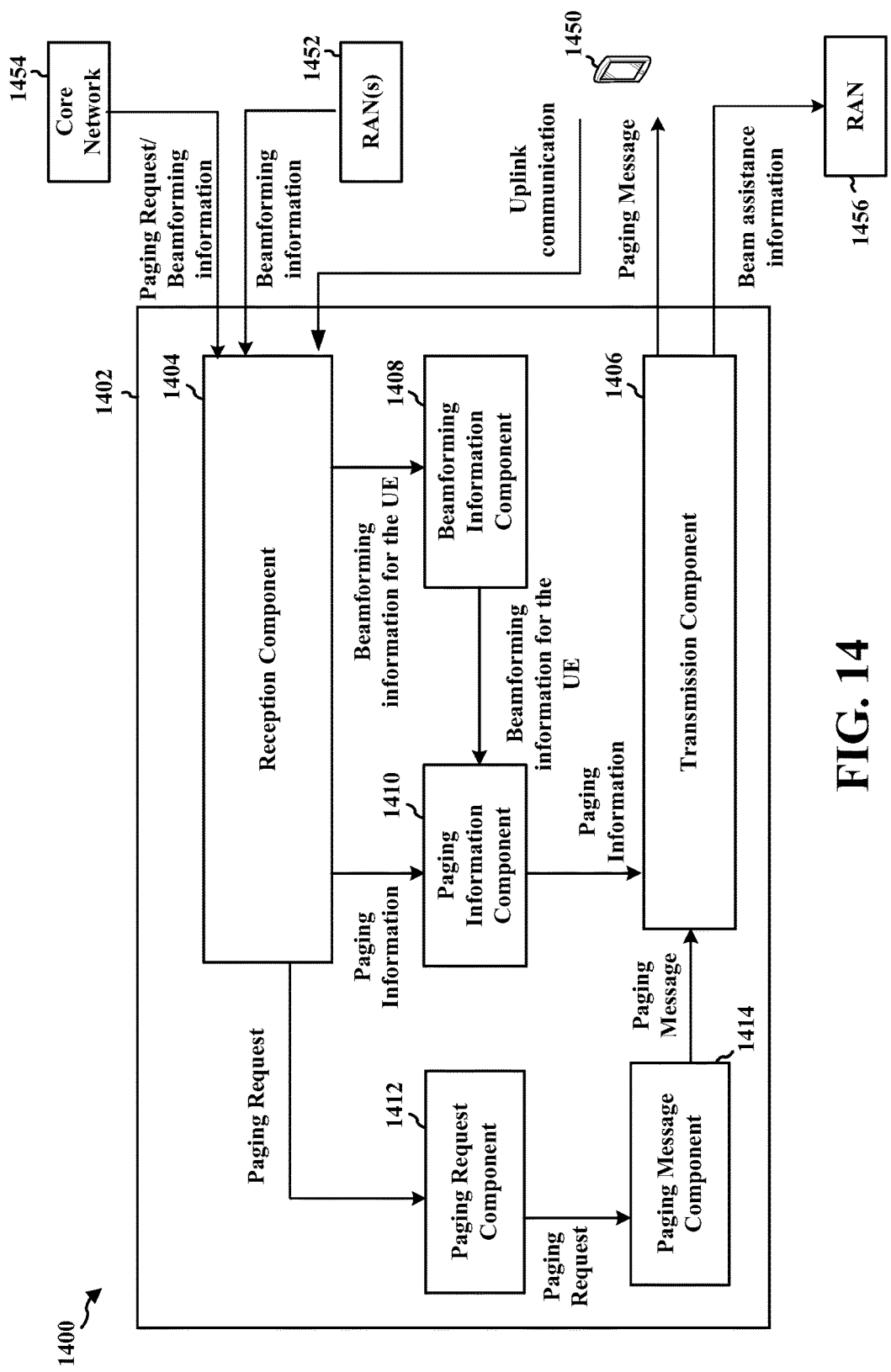
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a RAN (e.g., RAN 504, RAN 506, RAN 802, 804, base station 180, 310, 402). The apparatus includes a reception component 1404 that receives uplink communication from UE 1450. The reception component 1404 may also receive communication and information from a core network 1454 (e.g., AMF 508, 808) and from other RAN(s) 1452. The apparatus may include a transmission component that transmits downlink communication to UE 1450. The transmission component may also transmit communication to other RAN(s) 1456 and/or to core network 1454. At times the apparatus may perform the aspects described in connection with a last serving RAN, e.g., RAN1 504, RAN 802. At other times, the apparatus may perform the aspects described in connection with a RAN receiving a paging request and beamforming assistance information, e.g., RAN2 506, RAN 804. The apparatus may include a beamforming information component 1408 that determines beamforming information for UE 1450 served by the RAN. The beamforming information may be based on communication with the UE 1450. The apparatus may include a paging information component 1410 that transmits, to either a second RAN 1456 or a core network, e.g., AMF, 1454, paging information for the UE served by the first RAN, wherein the paging information comprises the beamforming information for the UE 1450. The reception component 1404 may receive additional beamforming information regarding the UE from the core network 1454 or other RAN(s) 1452. Thus, the beamforming information determined for the UE with beamforming information component 1408 may be based not only on communication with the UE, but also on beamforming information received from the core network 1454 or other RAN(s) 1452. A paging message component may send a paging message to the UE 1450 based on the additional beamforming information.

In other examples, in which the apparatus is configured to perform the aspects described in connection with RAN2 506 or RAN 804, the apparatus may include a paging request component 1412 that receives a paging request for the UE 1450. The paging information component may receive from at least one of a second RAN, a third RAN 1452 and a core network 1454, paging information regarding the UE served by the second RAN, wherein the paging information comprises beamforming information for the UE. The apparatus may include a paging message component 1414 that transmits a paging message to the UE, in connection with transmission component 1406, based on the beamforming information comprised in the paging information.

The apparatus may include additional components that perform each of the blocks of the algorithm in the aforementioned flowcharts of FIGS. 6, 7, 12, and 13. As such, each block in the aforementioned flowcharts of FIGS. 6, 7, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
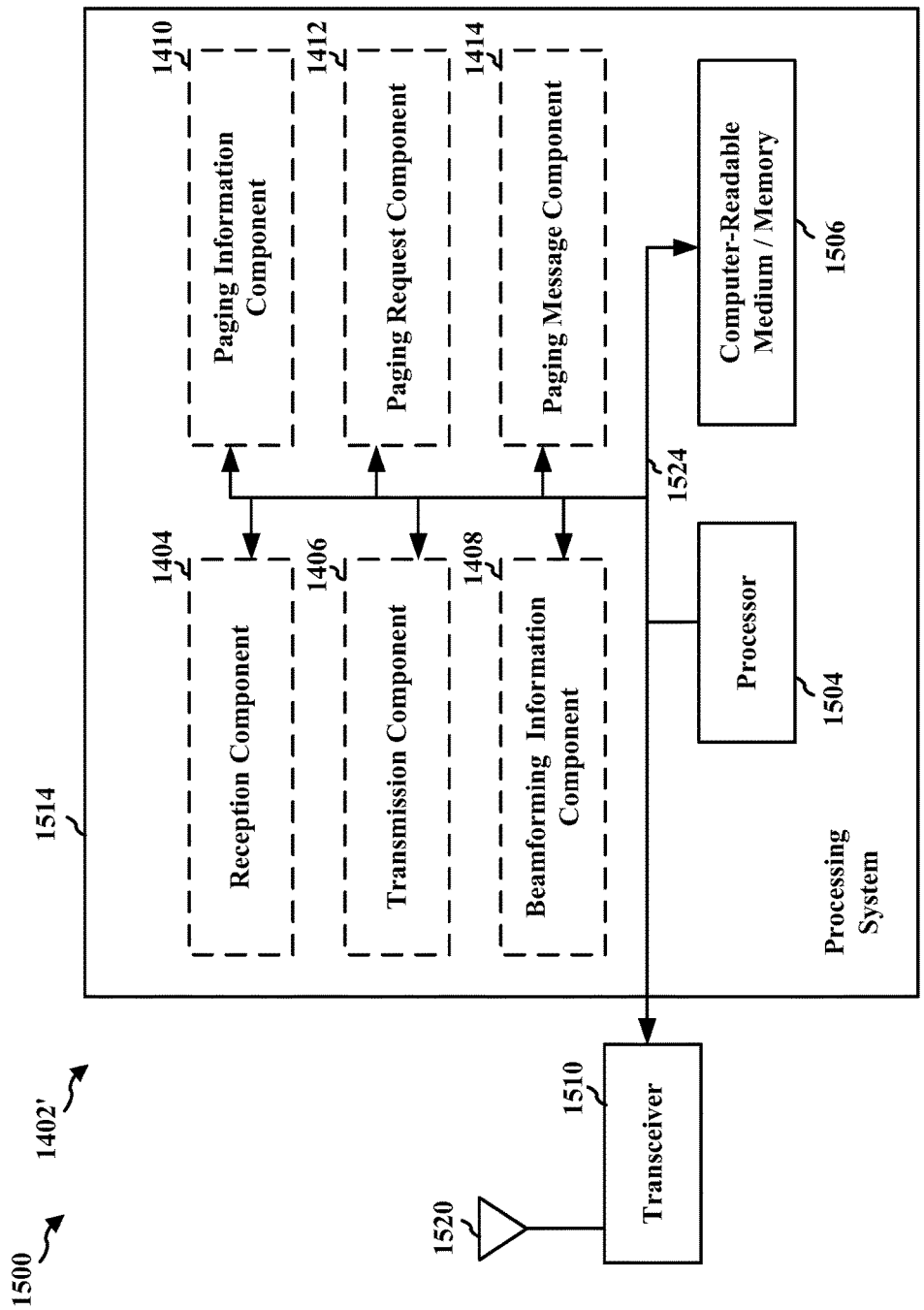
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375.

In one configuration, the apparatus 1402/1402' for wireless communication includes means for determining beamforming information for a UE served by the RAN (e.g., at least 1408); means for transmitting, to a second RAN or a core network, paging information for the UE served by the first RAN (e.g., at least 1410), wherein the paging information comprises the beamforming information for the UE; means for receiving (e.g., at least 1404, 1410) additional beamforming information regarding the UE from the core network wherein the additional beamforming information comprises information derived from at least one additional RAN; means for receiving a paging request for the UE (e.g., at least 1412); means for receiving from another RAN, paging information regarding the UE (e.g., at least 1410), wherein the paging information comprises beamforming information for the UE; and means for transmitting a paging message to the UE (e.g., at least 1414). The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is a method of wireless communication, comprising: receiving, from a first RAN, paging information regarding a UE served by the first RAN, wherein the paging information comprises beamforming information for the UE; and sending a paging request to a second RAN for transmission of a paging message to the UE, wherein the paging request is based on the received beamforming information.

In Example 2, the method of Example 1 further includes the beamforming information comprises at least one of: a last beam direction used by the first RAN to communicate with the UE; beam direction statistics for the UE; information regarding downlink beam measurements or uplink beam measurements for the UE; angular direction information or location information relative to the first RAN; an expected trajectory for the UE; an indication of a recommended beam direction; a UE beam-forming capability; and a UE type indicating whether the UE comprises one of a fixed UE, a mobile UE, a relay UE, or an access UE.

In Example 3, the method of Example 1 or 2 further include that the recommended beam direction is based on UE beam measurements from neighboring cells.

In Example 4, the method of any of Examples 1-3 further include that the recommended beam direction is based on inter-cell measurements performed by the first RAN.

In Example 5, the method of any of Examples 1-4 further include that the beamforming information is received from the first RAN comprised in a paging assistance message.

In Example 6, the method of any of Examples 1-5 further include that the beamforming information is received from the first RAN separately from a paging assistance message.

In Example 7, the method of any of Examples 1-6 further include: determining a paging strategy based on the received beamforming information, the determining the paging strategy comprising at least one of: determining the second RAN to which to transmit the paging request; determining at least one cell within the second RAN for transmission of the paging message to the UE; determining at least one direction for transmission of the paging message to the UE; and determining beamforming assistance information for transmission to the second RAN.

In Example 8, the method of any of Examples 1-7 further include that the paging strategy is based on additional beamforming information for the UE received from at least one additional RAN.

In Example 9, the method of any of Examples 1-8 further include signaling beamforming assistance information to the second RAN based on the received beamforming information for the UE.

In Example 10, the method of any of Examples 1-9 further include that the beamforming assistance information signaled to the second RAN comprises at least a part of the beamforming information received from the first RAN.

In Example 11, the method of any of Examples 1-10 further include that the beamforming assistance information signaled to the second RAN comprises at least one of: recommended beam direction information; UE beamforming capability information; a UE type indicating whether the UE comprises one of a fixed UE, a mobile UE, a relay UE, or an access UE; an identity of the first RAN; or an identity of a cell of the first RAN that was associated with the UE.

In Example 12, the method of any of Examples 1-11 further include that the beamforming assistance information is signaled to the second RAN in the paging request.

In Example 13, the method of any of Examples 1-11 further include that the beamforming assistance information is signaled to the second RAN separately from the paging request.

In Example 14, the method of any of Examples 1-13 further include that the beamforming assistance information is signaled to the second RAN through one or more other RANs.

Example 15 is a device including one or more processors and one or more memories in electronic communication with the one or more processors storing instructions executable by the one or more processors to cause the system or apparatus to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a first RAN, comprising: determining beamforming information for a user equipment (UE) served by the first RAN; and transmitting, to a second RAN or a core network, paging information for the UE served by the first RAN, wherein the paging information comprises the beamforming information for the UE. In Example 19, the method of Example 18 further includes that the UE is in an idle mode, and the first RAN transmits the paging information to the core network.

In Example 20, the method of Example 18 or 19 further include that the UE is in an Radio Resource Control (RRC) connected inactive mode and the first RAN transmits the paging information to the second RAN.

In Example 21, the method of any of Examples 18-20 further include that the beamforming information comprises at least one of: a last beam direction used by the first RAN to communicate with the UE; beam direction statistics for the UE; information regarding downlink beam measurements or uplink beam measurements for the UE; angular direction information or location information relative to the first RAN; an expected trajectory for the UE; an indication of a recommended beam direction; a UE beam-forming capability; or a UE type indicating whether the UE comprises one of a fixed UE, a mobile UE, a relay UE, or an access UE.

In Example 22, the method of any of Examples 18-21 further include that the recommended beam direction is based on UE beam measurements from neighboring cells.

In Example 23, the method of any of Examples 18-22 further include that the recommended beam direction is based on inter-cell measurements performed by the first RAN.

In Example 24, the method of any of Examples 18-23 further include that the beamforming information is transmitted from the first RAN in a paging assistance message.

In Example 25, the method of any of Examples 18-23 further include that the beamforming information is transmitted from the first RAN separately from a paging assistance message.

In Example 26, the method of any of Examples 18-23 further include that the beamforming information is transmitted from the first RAN to the second RAN in Xn signaling.

In Example 27, the method of any of Examples 18-26 further include receiving additional beamforming information regarding the UE from the core network wherein the additional beamforming information comprises information derived from at least one additional RAN; and sending a paging message to the UE based on the additional beamforming information.

In Example 28, the method of any of Examples 18-27 further include that the paging information for the UE is transmitted to the second RAN when the first RAN does not receive a response from the UE to the paging message.

In Example 29, the method of any of Examples 18-28 further include that the additional beamforming information comprises at least one of beam measurements corresponding to the UE for the at least one additional RAN, statistics of a trajectory for the UE based on information from the at least one additional RAN, a recommended cell, and a recommended direction.

Example 30 is a device including one or more processors and one or more memories in electronic communication with the one or more processors storing instructions executable by the one or more processors to cause the system or apparatus to implement a method as in any of Examples 18-29.

Example 31 is a system or apparatus including means for implementing a method or realizing an apparatus as in any of Examples 18-29.

Example 32 is a non-transitory computer readable medium storing instructions executable by one or more processors to cause the one or more processors to implement a method as in any of Examples 18-29.

Example 33 is a method of wireless communication at a first RAN, comprising: receiving a paging request for a UE; receiving, from at least one of a second RAN, a third RAN and a core network, paging information regarding the UE served by the second RAN, wherein the paging information comprises beamforming information for the UE; and transmitting a paging message to the UE based on the beamforming information comprised in the paging information.

In Example 34, the method further includes that transmitting the paging message to the UE comprises selecting a beam direction for transmission of the paging message based on the beamforming information for the UE.

In Example 35, the method of example 33 or example 34 further includes that the first RAN further determines a paging strategy based on the beamforming information for the UE, wherein the paging strategy comprises at least one of a priority level associated with at least one beam direction and a frequency associated with the at least one beam direction.

In Example 36, the method of any of examples 33-35 further includes that the UE is in an idle mode, and the paging information is received from the core network.

In Example 36, the method of any of examples 33-36 further includes that the UE is in a Radio Resource Control (RRC) connected inactive mode and the paging information is received from the second RAN.

In Example 37, the method of any of examples 33-37 further includes that the beamforming information comprises at least one of: a last beam direction used by the second RAN to communicate with the UE; beam direction statistics for the UE; information regarding downlink beam measurements or uplink beam measurements for the UE; angular direction information or location information relative to the second RAN; an expected trajectory for the UE; an indication of a recommended beam direction; a UE beam-forming capability; a UE type indicating whether the UE comprises one of a fixed UE, a mobile UE, a relay UE, or an access UE; an identity of the second RAN; and an identity of a cell of the second RAN that was associated with the UE.

In Example 39, the method of any of examples 33-38 further includes that the recommended beam direction is based on UE beam measurements from neighboring cells.

In Example 40, the method of any of examples 33-39 further includes that the recommended beam direction is based on inter-cell measurements performed by the second RAN.

In Example 41, the method of any of examples 33-40 further includes that the beamforming information is received from the core network in the paging request.

In Example 42, the method of any of examples 33-40 further includes that the beamforming information is received from the core network separately from the paging request.

In Example 43, the method of any of examples 33-40 further includes that the beamforming information is received from the second RAN in Xn signaling.

Example 44 is a device including one or more processors and one or more memories in electronic communication with the one or more processors storing instructions executable by the one or more processors to cause the system or apparatus to implement a method as in any of Examples 33-43.

Example 45 is a system or apparatus including means for implementing a method or realizing an apparatus as in any of Examples 33-43.

Example 46 is a non-transitory computer readable medium storing instructions executable by one or more processors to cause the one or more processors to implement a method as in any of Examples 33-43.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. The phrase "A or B" may correspond to A only, B only, or A and B. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving, from a first Radio Access Network (RAN), paging information regarding a user equipment (UE) served by the first RAN, wherein the paging information comprises beamforming information for the UE; and
   sending a paging request to a second RAN for transmission of a paging message to the UE, wherein the paging request is based on the beamforming information received from the first RAN.

2. The method of claim 1, wherein the beamforming information comprises at least one of:
   a last beam direction used by the first RAN to communicate with the UE;
   beam direction statistics for the UE;
   beam measurement information regarding downlink beam measurements or uplink beam measurements for the UE;
   angular direction information or location information relative to the first RAN;
   an expected trajectory for the UE;
   an indication of a recommended beam direction;
   a UE beam-forming capability; and
   a UE type indicating whether the UE comprises one of a fixed UE, a mobile UE, a relay UE, or an access UE.

3. The method of claim 2, wherein the recommended beam direction is based on at least one of UE beam measurements from neighboring cells or inter-cell measurements performed by the first RAN.

4. The method of claim 1, wherein the beamforming information is received from the first RAN comprised in a paging assistance message.

5. The method of claim 1, wherein the beamforming information is received from the first RAN separately from a paging assistance message.

6. The method of claim 1, further comprising:
   determining a paging strategy based on the beamforming information received from the first RAN, the determining the paging strategy comprising at least one of:
      determining the second RAN to which to transmit the paging request;
      determining at least one cell within the second RAN for transmission of the paging message to the UE;
      determining at least one direction for transmission of the paging message to the UE; and
      determining beamforming assistance information for transmission to the second RAN.

7. The method of claim 6, wherein the paging strategy is based on additional beamforming information for the UE received from at least one additional RAN.

8. The method of claim 1, further comprising:
   signaling beamforming assistance information to the second RAN based on the beamforming information received from the first RAN for the UE.

9. The method of claim 8, wherein the beamforming assistance information signaled to the second RAN comprises at least a part of the beamforming information received from the first RAN.

10. The method of claim 8, wherein the beamforming assistance information signaled to the second RAN comprises at least one of:
    recommended beam direction information;
    UE beamforming capability information;
    a UE type indicating whether the UE comprises one of a fixed UE, a mobile UE, a relay UE, or an access UE;
    a RAN identity of the first RAN; and
    a cell identity of a cell of the first RAN that was associated with the UE.

11. The method of claim 8, wherein the beamforming assistance information is signaled to the second RAN in the paging request.

12. The method of claim 8, wherein the beamforming assistance information is signaled to the second RAN separately from the paging request.

13. The method of claim 8, wherein the beamforming assistance information is signaled to the second RAN through one or more other RANs.

14. An apparatus for wireless communication, comprising:
    a memory; and
    at least one processor coupled to the memory and configured to:
       receive, from a first Radio Access Network (RAN), paging information regarding a user equipment (UE) served by the first RAN, wherein the paging information comprises beamforming information for the UE; and
       send a paging request to a second RAN for transmission of a paging message to the UE, wherein the paging request is based on the beamforming information received from the first RAN.

15. A method of wireless communication at a first Radio Access Network (RAN), comprising:
   determining beamforming information for a user equipment (UE) served by the first RAN; and
   transmitting, from the first RAN, paging information for a second RAN to page the UE, wherein the paging information comprises the beamforming information for sending a paging request the UE from the second RAN.

16. The method of claim 15, wherein the UE is in an idle mode, and the first RAN transmits the paging information to a core network, or
   wherein the UE is in an Radio Resource Control (RRC) connected inactive mode and the first RAN transmits the paging information to the second RAN.

17. The method of claim 15, wherein the beamforming information comprises at least one of:
   a last beam direction used by the first RAN to communicate with the UE;
   beam direction statistics for the UE;
   beam measurement information regarding downlink beam measurements or uplink beam measurements for the UE;
   angular direction information or location information relative to the first RAN;
   an expected trajectory for the UE;
   an indication of a recommended beam direction;
   a UE beam-forming capability; and
   a UE type indicating whether the UE comprises one of a fixed UE, a mobile UE, a relay UE, or an access UE.

18. The method of claim 17, wherein the recommended beam direction is based on at least one of UE beam measurements from neighboring cells or inter-cell measurements performed by the first RAN.

19. The method of claim 15, wherein the beamforming information is transmitted from the first RAN in a paging assistance message.

20. The method of claim 15, wherein the beamforming information is transmitted from the first RAN separately from a paging assistance message.

21. The method of claim 15, wherein the beamforming information is transmitted from the first RAN to the second RAN in Xn signaling.

22. The method of claim 15, further comprising:
   receiving additional beamforming information regarding the UE from a core network wherein the additional beamforming information comprises information derived from at least one additional RAN; and
   sending a paging message to the UE based on the additional beamforming information,
   wherein the additional beamforming information comprises at least one of beam measurements corresponding to the UE for the at least one additional RAN, statistics of a trajectory for the UE based on information from the at least one additional RAN, a recommended cell, or a recommended direction.

23. The method of claim 22, wherein the paging information for the UE is transmitted to the second RAN when the first RAN does not receive a response from the UE to the paging message.

24. A method of wireless communication at a first Radio Access Network (RAN), comprising:
   receiving a paging request for a user equipment (UE);
   receiving, from at least one of a second RAN, a third RAN and a core network, paging information regarding the UE served by the second RAN, wherein the paging information comprises beamforming information for the UE; and
   transmitting a paging message to the UE based on the beamforming information comprised in the paging information.

25. The method of claim 24, wherein transmitting the paging message to the UE comprises selecting a beam direction for transmission of the paging message based on the beamforming information for the UE.

26. The method of claim 25, wherein the first RAN further determines a paging strategy based on the beamforming information for the UE, wherein the paging strategy comprises at least one of a priority level associated with at least one beam direction and a frequency associated with the at least one beam direction.

27. The method of claim 24, wherein the UE is in an idle mode, and the paging information is received from the core network, or
   wherein the UE is in a Radio Resource Control (RRC) connected inactive mode and the paging information is received from the second RAN.

28. The method of claim 24, wherein the beamforming information comprises at least one of:
   a last beam direction used by the second RAN to communicate with the UE;
   beam direction statistics for the UE;
   beam measurement information regarding downlink beam measurements or uplink beam measurements for the UE;
   angular direction information or location information relative to the second RAN;
   an expected trajectory for the UE;
   an indication of a recommended beam direction;
   a UE beam-forming capability;
   a UE type indicating whether the UE comprises one of a fixed UE, a mobile UE, a relay UE, or an access UE;
   a RAN identity of the second RAN; and
   a cell identity of a cell of the second RAN that was associated with the UE.

29. The method of claim 28, wherein the recommended beam direction is based on at least one of UE beam measurements from neighboring cells or inter-cell measurements performed by the second RAN.

30. The method of claim 24, wherein the beamforming information is received from the core network or is received from the second RAN in Xn signaling.

* * * * *